United States Patent
Kakumaru

(10) Patent No.: US 8,861,385 B2
(45) Date of Patent: Oct. 14, 2014

(54) COMMUNICATION DEVICE, COMMUNICATION METHOD AND COMMUNICATION CONTROL PROGRAM

(75) Inventor: Takahiro Kakumaru, Tokyo (JP)

(73) Assignee: NEC Corporation, Tokyo (JP)

( * ) Notice: Subject to any disclaimer, the term of this patent is extended or adjusted under 35 U.S.C. 154(b) by 555 days.

(21) Appl. No.: 12/992,634

(22) PCT Filed: May 15, 2009

(86) PCT No.: PCT/JP2009/059054
§ 371 (c)(1),
(2), (4) Date: Nov. 15, 2010

(87) PCT Pub. No.: WO2009/139465
PCT Pub. Date: Nov. 19, 2009

(65) Prior Publication Data
US 2011/0066756 A1    Mar. 17, 2011

(30) Foreign Application Priority Data

May 16, 2008 (JP) .................................. 2008-129664

(51) Int. Cl.
*H04L 12/26* (2006.01)
*H04L 29/12* (2006.01)
*H04W 8/26* (2009.01)

(52) U.S. Cl.
CPC ............ *H04W 8/26* (2013.01); *H04L 29/1232* (2013.01); *H04L 61/2092* (2013.01); *H04L 29/12839* (2013.01); *H04L 61/6022* (2013.01)
USPC ........... 370/252; 709/220; 709/221; 709/223; 709/226; 709/230; 370/255

(58) Field of Classification Search
CPC .. H04L 61/6022; H04L 61/2092; H04W 8/26
USPC ......... 709/245, 220, 221, 223, 226, 230, 228; 370/252, 255
See application file for complete search history.

(56) References Cited

U.S. PATENT DOCUMENTS 6,925,079 B2 * 8/2005 Matsukawa ................... 370/389
7,246,272 B2 * 7/2007 Cabezas et al. ................ 714/53

(Continued)

FOREIGN PATENT DOCUMENTS

CN    1976360 A     6/2007
JP    2001308909 A  11/2001

(Continued)

OTHER PUBLICATIONS

W. Richard Stevens, "TCP/IP Illustrated, vol. 1: The Protocols", Softbank Books, Mar. 31, 1997, pp. 69-70.

(Continued)

*Primary Examiner* — Joey Bednash
*Assistant Examiner* — Kuo T Chiang
(74) *Attorney, Agent, or Firm* — Sughrue Mion, PLLC

(57) ABSTRACT

A communication device selects a layer 2 address to be changed, and transmits a presence check request message via a network to which the communication device is connected. The communication device determines, based on a received result of the presence check request message, whether the layer 2 address is duplicated with another communication device connected to the network. When the communication device confirms the layer 2 address is not duplicated, the communication device changes the layer 2 address of the communication device.

19 Claims, 17 Drawing Sheets

(56) References Cited

U.S. PATENT DOCUMENTS

| | | |
|---|---|---|
| 7,492,772 B2 * | 2/2009 | Nam et al. ............... 370/395.54 |
| 8,194,586 B2 * | 6/2012 | Mizukoshi .................... 370/328 |
| 8,249,086 B2 * | 8/2012 | Hirano et al. ................. 370/401 |
| 2005/0007962 A1 | 1/2005 | Nam et al. |
| 2005/0188241 A1 | 8/2005 | Cabezas et al. |
| 2006/0165100 A1 * | 7/2006 | Huang et al. ................. 370/400 |
| 2007/0026858 A1 | 2/2007 | Mizukoshi |
| 2007/0073882 A1 * | 3/2007 | Brown et al. ................. 709/226 |
| 2008/0215712 A1 * | 9/2008 | Ohara ........................... 709/220 |

FOREIGN PATENT DOCUMENTS

| | | |
|---|---|---|
| JP | 2004048175 A | 2/2004 |
| JP | 2005-33765 A | 2/2005 |
| JP | 2006-16972 A | 1/2006 |
| JP | 2006512877 A | 4/2006 |
| JP | 2006253811 A | 9/2006 |
| JP | 2007104245 A | 4/2007 |
| JP | 2007236765 A | 9/2007 |
| JP | 2008016972 A | 1/2008 |
| JP | 2008048252 A | 2/2008 |

OTHER PUBLICATIONS

Chinese Office Action for CN Application No. 200980117554.7 issued on May 16, 2013 with English Translation.
International Search Report of PCT Application No. PCT/JP2009/059054 mailed on Jun. 16, 2009.
Japanese Notice Allowance for JP Application No. 2010-512031 mailed on Oct. 1, 2013 with Partial English Translation.

* cited by examiner

COMMUNICATION DEVICE, COMMUNICATION METHOD AND COMMUNICATION CONTROL PROGRAM

TECHNICAL FIELD

This application is the National Phase of PCT/JP2009/059054, filed May 15, 2009, which claims priority to and the benefit of Japanese Patent Application No. 2008-129664 filed on May 16, 2008, the disclosure of which is incorporated herein by reference.

BACKGROUND ART

Open System Interconnection (OSI) is a standard in which a design policy of a network architecture for realizing data communication between different types of devices is defined. This standard has been standardized by the International Organization for Standardization (ISO). OSI defines an OSI basic reference model in which a network is hierarchically built, in order to verify interconnection between networks.

A communication device including a communication interface for communication on a local area network (LAN) identifies an opponent when performing communication on a data link layer in the OSI basic reference model. A media access control (MAC) address is used for this identification. The MAC address is a unique identifier (ID) number assigned to each communication interface or each card-type communication interface card of the communication device. Communication interfaces in the world are assigned unique numbers by the MAC addresses. Communication between devices on the LAN is performed based on the MAC addresses. The MAC address is managed and assigned by the Institute of Electrical and Electronic Engineers (IEEE). The MAC address is a combination of a unique number for each manufacturer and a number assigned by the manufacturer.

In general, a communication device permanently uses a value of an initially assigned MAC address. However, the MAC address is not necessarily limited to such a form. For example, the case in which a plurality of communication interfaces are virtually realized with one physical communication interface is considered. In this case, MAC addresses other than the initially assigned MAC address are assigned, and a plurality of MAC addresses are used for operation. This primarily is the case in which virtual devices are configured so that one physical communication device operates as a plurality of devices. There is another case in which, for example, a redundant system is built using a server.

The MAC address is assigned in advance when a communication device is manufactured. For this reason, the MAC address is less likely to be duplicatively assigned in a management environment. Therefore, when it is assumed that a communication device is manufactured under the thus managed mechanism, it can be said that the MAC address guarantees that a communication interface is unique. However, the MAC address is likely to be duplicated between communication devices, for example, due to troubles generated in a manufacture process.

In recent years, various wireless communication devices beginning with wireless LAN devices have been mounted on personal computers, peripheral devices, portable telephones, game machines, home electric appliances, and so on. For communication in such a wireless environment, encryption at a communication path in a wireless section, authentication upon communication initiation, and the like are used and communication contents are protected.

Meanwhile, for identification of an opponent in communication, a MAC address of a communication device is used as a destination. This MAC address is not encrypted. For this reason, a third party can identify the MAC address used for communication. This is not desirable from the perspective of privacy.

There is another situation in which a MAC address is changed. For example, service in which an Internet service provider is notified in advance of a MAC address of a communication device connected to the Internet to restrict the access to the Internet from other communication devices is assumed. A communication device of a person receiving such service is assumed to have failed and be unable to connect to the Internet. In this case, even though another communication device is used instead of the communication device incapable of communication, the other communication device cannot connect to the Internet due to a different MAC address. Here, in order to resolve this trouble, a contractor with the Internet service provider temporarily changes a MAC address of a communication device used as a substitute into a registered MAC address to connect to the Internet.

As described above, even though the MAC address of the communication interface is permanently used for the communication device, there are several situations in which the MAC address is changed.

When the MAC address is changed, the MAC address may be duplicated between different communication devices. When a plurality of communication devices having the same MAC address are present on the network as a LAN structure, it is impossible to identify the communication devices. That is, it is impossible to specify an opponent to communicate. For this reason, MAC address duplication is a severe issue.

Here, there are various mechanisms of discriminating MAC address duplication, as related techniques. Among them, in a first related technique, it is monitored whether a MAC address to be used in a state in which a communication device is connected to a network is already being used on the network based on a transmission source address for the received data. In the first related technique, it is necessary to continuously perform monitoring for a certain time in order to discriminate whether a MAC address to be used is already being used. Even when such a duplicated MAC address is present, it is not guaranteed that data as a determination criterion arrives at a communication device as a duplication detection object.

For example, it is assumed that a switching hub is used in a network. The switching hub parses data transmitted from a communication device to detect a destination, and transmits data only to a terminal at a destination. As a result, even when a duplicated MAC address is detected, this detection result is likely not to be transmitted to a communication device as a duplication detection object. As a result, it takes time to discriminate whether the MAC address is duplicated.

A second related technique that is the same mechanism as the mechanism of discriminating such address duplication is also known. In the second related technique, Internet protocol (IP) address duplication is checked in a network layer. A method called "gratuitous address resolution protocol (ARP)" is a method of checking IP address duplication. In this method, an ARP protocol used to obtain a MAC address from an IP address is applied (e.g., see Non-Patent Document 1).

Normally, an IP address with which a communication device desires to communicate is set in a destination IP address. On the other hand, in Non-Patent Document 1, an IP address of a communication device or an IP address for which duplication is to be checked is set in the destination IP address. When such an ARP request is broadcast and a response is received, it is determined that a communication device having the IP address is present on the network. However, the second related technique cannot realize MAC address duplication check.

Unlike the ARP, a reverse ARP (RARP) is a protocol for acquiring an IP address from a MAC address. In the ARP, it is common for a communication device having the IP address to respond. On the other hand, in the RARP, when a previously set RARP server is present, there is a response when the MAC address is broadcast. Further, there is a response when a MAC address and an IP address are caused to correspond to each other irrespective of whether the relevant communication device is present on the network. Accordingly, when the RARP is used, it is impossible to check whether the communication device of the broadcast MAC address is present.

Another method of checking IP address duplication includes a method using duplicated address detection (DAD) included in Internet protocol version 6 (IPv6). In this method, a communication device that checks the duplication transmits a DAD message to a communication device on the network in order to discriminate whether the same IP address is being used. If a communication device using the IP address is present on the network, since this communication device responds to the DAD message response, it is possible to discriminate whether the same IP address is being used.

As an automatic IP address generation function in IPv6, there is a method of generating an IP address by combining a prefix portion included in a router notification message advertised by a router with a MAC address of the communication device. Accordingly, it may be possible to check the MAC address duplication.

However, automatic IP address generation based on a MAC address in IPv6 cannot be used in all environments. Accordingly, it is difficult to identify a MAC address from an IP address, and it is impossible to substitute IP address duplication check with MAC address duplication check.

Meanwhile, as a third related technique, a technique in which a base station receives a first MAC layer connection message from a mobile terminal and checks whether the same MAC address as that of the mobile terminal is present in the same sub-network has been proposed (e.g., see Patent Document 1). In the third related technique, a connection request on a data link layer is made from a communication terminal to a base station in an IPv6 environment, and a MAC address of the communication terminal is notified of together. The base station retrieves a neighbor list table and checks if the same MAC address is used within the same sub-network. The result of checking MAC address duplication is returned to the communication device.

Thus, in the third related technique, the base station checks MAC address duplication upon a connection on the data link layer. For this reason, when it is determined that the MAC address is duplicated, the base station generates a temporary MAC address having the same length as that of the MAC address. The base station similarly checks MAC address duplication on this temporary MAC address. Thus, when the base station generates a non-duplicated MAC address, the base station combines a prefix with the generated MAC address to generate a 128-bit IPv6 address.

However, in the third related technique, when it is determined that the MAC address is duplicated, a communication terminal that is using the MAC address is likely to suffer from communication failure. This is because it is difficult to perform duplication check before the MAC address is used. Also, it is because the MAC address is used upon connection on the data link layer, before the MAC address duplication is checked.

For example, it is assumed that communication terminals having the same MAC address are present in the same network. In this case, when a connection request on the data link layer is made from the above-described communication terminal to the base station, it is difficult to discriminate an existing communication device having the same MAC address. In particular, when the communication device is performing wireless communication, existing communication is likely to be interrupted in the worst case. Even in this case, it is necessary for the base station to recognize all MAC addresses of communication devices on the network. Accordingly, it is difficult to monitor or manage the MAC addresses.

Further, it is easy to identify whether any communication device uses any application by each communication device continuously using the MAC address. Accordingly, it is necessary to change the MAC address at some timing. However, it is difficult to specify the timing at which the process is to be performed.

It is also necessary to check the MAC address duplication before the MAC address is changed in order to avoid MAC address duplication with a communication device on the network. However, it takes a time to check the MAC address duplication. Accordingly, a temporal loss occurs from a time when a communication application is instructed to start up to a time when the communication application is actually executed. This degrades user convenience.

When it is assumed that a wireless communication terminal is capable of changing a MAC address, the following issue is generated. That is, for example, when use in an enterprise is assumed, user management is performed based on the MAC address in many cases. For example, in a wireless LAN connection, access restriction based on a MAC address is performed or when dynamic IP address assignment using dynamic host configuration protocol (DHCP) is used, the IP address is assigned as a fixed one to a user by causing the MAC address and the IP address to correspond to each other.

Thus, the MAC address of the wireless communication terminal is dynamically changed and used, whereas there is a situation in which the MAC address is used as a fixed one. In such a situation, there are various issues in how to switch the MAC address.

A first problem is associated with a communication device having a communication interface, in which the MAC address of the communication interface is changed. In such a communication device, it is necessary to provide a MAC address management device equivalent to a server, on a network, in order to check MAC address duplication with a communication device on the network. This is because such a server manages the MAC address of the communication device on the network. Also, it is because there is no method of spontaneously checking the MAC address duplication in the communication device.

A second problem is associated with a communication device trying to check MAC address duplication with a communication device on a network. When a communication device having the same MAC address is present on the network, MAC address duplication check may cause communication of an existing communication device to be interrupted. This is because the duplication check is performed using a MAC address to be checked before the MAC address duplication check is completed.

A third problem will be described. A communication device that is performing data communication checks a time when the communication device is connected to a network checks whether the MAC address is duplicated at an initial timing. If the MAC address is processed once in this confirmation, the same MAC address continues to be used during communication connection. While the time when the communication device is connected to the network and a solution to the case in which the MAC address is duplicated at the initial timing are considered as described above, a subsequent change is not considered. Therefore, a privacy issue relating to a relationship between applications is not considered. In particular, the privacy issue is severe in a wireless terminal connected to a wireless network from the perspective of a likelihood of terminal specifying due to the MAC address being known to a third party.

A fourth problem is associated with a wireless communication terminal including a wireless device to perform wireless communication. Such a wireless communication terminal may use a MAC address set as a fixed one or a dynamically changed MAC address according to a network to which the wireless communication terminal is connected and a use situation. However, there is no mechanism for changing the MAC address. This is because only a solution to the MAC address being duplicated is considered, similar to the third problem.

Non-Patent Document 1: "4.7 Gratuitous ARP," detailed TCP/IP, TCP/IP Illustrated, Volume 1: The Protocols, W. Richard Stevens, pp 69-70

Patent Document 1: Japanese Patent Application Publication No. 2006-512877 (Paragraphs 0049 and 0050 and FIG. 7)

DISCLOSURE OF INVENTION

Problem to be Solved by the Invention

It is an object of the present invention to provide a communication device, a communication method, and a communication control program in which the communication device can spontaneously execute a duplication check for a used address in advance without preparing a particular server or an equivalent device and without affecting existing communication devices present on the network.

Means for Solving the Problem

According to an aspect of the present invention, there is provided a communication device including: an address selection unit which selects a layer 2 address that is a change candidate for the communication device; a presence check request generation unit which generates a presence check request message with a layer 2 address selected by the address selection unit as a destination, a current layer 2 address of the communication device as a transmission source, and a layer 3 address as a broadcast or multicast address; a presence check request transmission unit which transmits the presence check request message generated by the presence check request generation unit via a network to which the communication device is connected; a presence check response receiving unit which receives a presence check response message to the presence check request message via the network to which the communication device is connected; an address duplication determination unit which determines that a communication device having the layer 2 address selected by the address selection unit is present on the network when it is discriminated that there is the presence check response message from the result received by the presence check response receiving unit, and determines that the communication device having the layer 2 address selected by the address selection unit is not present on the network when it is discriminated that there is no presence check response message; and an address change unit which changes a current layer 2 address for a communication interface of the communication device into the layer 2 address selected by the address selection unit when a communication device having the layer 2 address selected by the address selection unit is found not to be present on the network based on the determination result of the address duplication determination unit.

According to another aspect of the present invention, there is provided a communication device including: an address selection unit which selects a layer 2 address that is a change candidate for the communication device; a presence check request generation unit which generates a presence check request message that is data link layer request data with a layer 2 address selected by the address selection unit as a destination and a current layer 2 address of the communication device as a transmission source, wherein another communication device connected with the communication device via a network and receives the data link layer request data responds with data link layer response data as a response to the communication device; a presence check request transmission unit which transmits the presence check request message generated by the presence check request generation unit via a network to which the communication device is connected; a presence check response receiving unit which receives a presence check response message as the data link layer response data to the presence check request message via the network to which the communication device is connected; an address duplication determination unit which determines that a communication device having the layer 2 address selected by the address selection unit is present on the network when it is discriminated that there is the presence check response message from the result received by the presence check response receiving unit, and determines that the communication device having the layer 2 address selected by the address selection unit is not present on the network when it is discriminated that there is no presence check response message; and an address change unit which changes a current layer 2 address for a communication interface of the communication device into the layer 2 address selected by the address selection unit when the communication device having the layer 2 address selected by the address selection unit is found not to be present on the network based on the determination result of the address duplication determination unit.

According to an aspect of the present invention, there is provided a communication method including: selecting a layer 2 address that is a change candidate for a communication device; generating a presence check request message with a layer 2 address selected in the address selection as a destination, a current layer 2 address of the communication device as a transmission source, and a layer 3 address as a broadcast or multicast address; transmitting the presence check request message generated in the presence check request generation via a network to which the communication device is connected; receiving a presence check response message to the presence check request message via the network to which the communication device is connected; determining that a communication device having the layer 2 address selected in the address selection is present on the network when it is discriminated that there is the presence check response message from the result received in the presence check response receiving, and determining that the communication device having the layer 2 address selected in the address selection is not present on the network when it is discriminated that there is no presence check response message; and changing a current layer 2 address for a communication interface of the communication device into the layer 2 address selected in the address selection when a communication device having the layer 2 address selected in the address selection is found not to be present on the network based on the determination result of the address duplication determination.

According to another aspect of the present invention, there is provided a communication method including: selecting a layer 2 address that is a change candidate for a communication device; generating a presence check request message that is data link layer request data with a layer 2 address selected in the address selection as a destination and a current layer 2 address of the communication device as a transmission source, wherein another communication device connected with the communication device via a network and receiving the data link layer request data responds with data link layer response data as a response to the communication device; transmitting the presence check request message generated in the presence cheek request generation via a network to which the communication device is connected; receiving a presence check response message as the data link layer response data to the presence check request message via the network to which the communication device is connected; determining that a communication device having the layer 2 address selected in the address selection is present on the network when it is discriminated that there is the presence check response message from the result received in the presence check response receiving, and determining that the communication device having the layer 2 address selected in the address selection is not present on the network when it is discriminated that there is no presence check response message; and changing a current layer 2 address for a communication interface of the communication device into the layer 2 address selected in the address selection when the communication device having the layer 2 address selected in the address selection is found not to be present on the network based on the determination result of the address duplication determination.

According to an aspect of the present invention, there is provided a communication control program causing a computer of a communication device connected with another device via a network to execute: selecting a layer 2 address that is a change candidate for the communication device; generating a presence check request message with a layer 2 address selected by the address selection as a destination, a current layer 2 address of the communication device as a transmission source, and a layer 3 address as a broadcast or multicast address; transmitting the presence check request message generated by the presence check request generation via a network to which the communication device is connected; receiving a presence check response message to the presence check request message via the network to which the communication device is connected; determining that a communication device having the layer 2 address selected by the address selection is present on the network when it is discriminated that there is the presence check response message from the result received by the presence check response receiving, and determining that the communication device having the layer 2 address selected by the address selection is not present on the network when it is discriminated that there is no presence check response message; and changing a current layer 2 address for a communication interface of the communication device into the layer 2 address selected by the address selection when a communication device having the layer 2 address selected by the address selection is found not to be present on the network based on the determination result of the address duplication determination.

According to another aspect of the present invention, there is provided a communication control program causing a computer of a communication device connected with another device via a network to execute: selecting a layer 2 address that is a change candidate for the communication device; generating a presence check request message that is data link layer request data with a layer 2 address selected in the address selection as a destination and a current layer 2 address of the communication device as a transmission source, wherein another communication device connected with the communication device via a network and receiving the data link layer request data responds with data link layer response data as a response to the communication device; transmitting the presence check request message generated by the presence check request generation via a network to which the communication device is connected; receiving a presence check response message as the data link layer response data to the presence check request message via the network to which the communication device is connected; determining that a communication device having the layer 2 address selected by the address selection is present on the network when it is discriminated that there is the presence check response message from the result received by the presence check response receiving, and determining that the communication device having the layer 2 address selected by the address selection is not present on the network when it is discriminated that there is no presence check response message; and changing a current layer 2 address for a communication interface of the communication device into the layer 2 address selected by the address selection when the communication device having the layer 2 address selected by the address selection is found not to be present on the network based on the determination result of the address duplication determination.

EFFECT OF THE INVENTION

According to the present invention, it is possible to actively execute a check of duplication with a layer 2 address of a communication device connected to a network without preparing a management device for storing and managing the layer 2 address of the communication device connected to the network in advance. This is because a response can be directly obtained from the communication device connected to the network by using the layer 2 address selected by the communication device as a destination.

According to the present invention, it is also possible to change the layer 2 address of the communication device without causing communication of the communication device connected to the network to fail due to layer 2 address duplication. This is because it is possible to reflect the layer 2 address in the communication device when it can be checked through communication device address duplication determination that the layer 2 address is not duplicated with respect to the communication device connected to the network.

REFERENCE SYMBOLS 100, 100A, 100B, 100C: Wireless communication system,
101: First wireless terminal,
102: Wireless base station,
103: First network,
104: Communication device,
105: Communication terminal,
107: Second network,
108: Router,
121, 121A, 121B, 121C, 121D: Main control unit,
122: Storage device,
123, 123B: Communication application unit,
124, 124A: Communication control unit,
125, 125A: Communication interface unit,
126, 126A, 126B: Network access control unit,
127, 127C: Address setting unit,
128, 128C, 128D: Address duplication determination unit,
129, 129C, 129D: Presence check request transmission unit,
130, 130C, 130D: Presence check response receiving unit,
151: CPU,
152: Main storage unit,
301, 301B, 301C: Second wireless terminal,
311, 311B, 311C: Privacy mode determination unit,
508: Router,
511: Privacy mode execution condition storage unit,
513: Privacy mode switching unit;
701: Presence check message check unit

BEST MODE FOR CARRYING OUT THE INVENTION

Next, each embodiment of the present invention will be described.

<First Embodiment>

Figure 1:
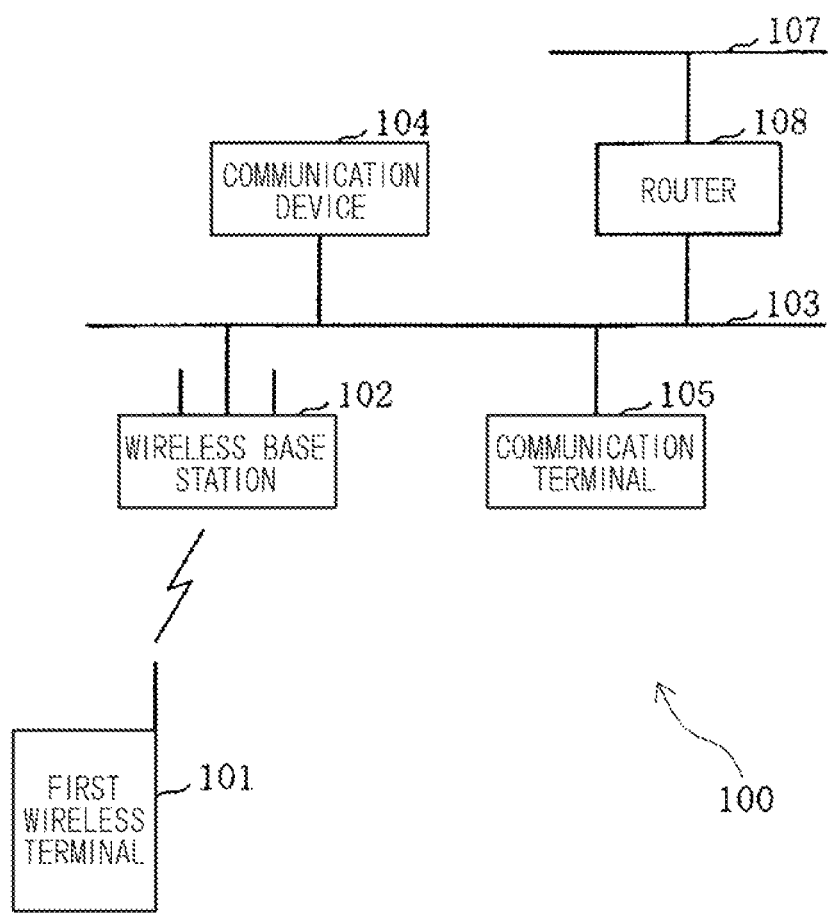
FIG. 1 illustrates a configuration of a wireless communication system in a first embodiment of the present invention.

FIG. 1 illustrates a configuration of a wireless communication system 100 in a first embodiment of the present invention. This wireless communication system 100 includes a first wireless terminal 101, a wireless base station 102, a first network 103, a communication device 104, a communication terminal 105, a second network 107, and a router 108.

The first network 103 is used when the first wireless terminal 101 communicates with another device. For example, the wireless base station 102 is connected to the first network 103. The first network 103 is, for example, a local area network (LAN) line or a wide area network (WAN) line. For example, the communication device 104 and the communication terminal 105 are connected to the first network 103, and the first wireless terminal 101 can communicate with the communication device 104 and the communication terminal 105. The router 108 connected to the first network 103 and the second network 107 as an external network enables the first wireless terminal 101 to communicate with a communication device or a communication terminal not shown on the second network 107.

The router 108 relays data of a network layer or a transport layer from one network (e.g., the first network 103) to the other network (e.g., the second network 107). The router 108 parses protocol of the network layer or the transport layer, transmits data, and discriminates any path to which data is to be transmitted or not to be transmitted based on an address of the network layer. A subnet built using the first network 103 and a subnet built using the external network 107 are divided by the router 108.

The communication device 104 communicates with a device connected to the first network 103, for example, using Internet protocol (IP). When the communication device 104 receives a frame that has been transmitted to the communication device 104, the communication device 104 processes the frame. More specifically, when the communication device 104 receives a frame that has been transmitted to a media access control (MAC) address assigned to an interface of the communication device 104, the communication device 104 identifies a frame type to output the frame to a protocol stack adapted to the type and executes a process in the protocol stack. For example, when the frame type is IP protocol, the frame is output to and processed in a protocol stack that processes IP. The communication device 104 performs the same process on a frame transmitted to a broadcast address, i.e., "FF: FF: FF: FF: FF: FF." as well as the MAC address of the communication device 104.

When the communication device 104 receives a presence check request message that has been transmitted to the communication device 104, the communication device 104 returns a presence check response to a transmission source address. Even when the communication device 104 receives the presence check request directed to a broadcast, the communication device 104 similarly returns a presence check response message. More specifically, the IP address set in the communication device 104 is an IP address in which a host portion among a network portion and the host portion constituting the IP address are all "1," or an IP address in which all are "1."

For example, it is assumed that the IP address of the communication device 104 is "1" and a subnet address is "255.255.255.0." In this case, "192.168.0.255" and "255.255.255.255," as well as "192.168.0.10" that is the IP address of the communication device 104, correspond to it. Even when positions in which the host portion is all "1" and all are "1" may be subjected to the same process as the case in which the host portion is all "0" and all are "0." The IP address set in the communication device 104 may be set statically or may be set dynamically, for example, by dynamic host configuration protocol (DHCP). This setting method is not particularly limited herein.

A function of the communication device 104 is not a function particularly related to the present embodiment, but is a function of a general communication device that performs IP communication. In the present embodiment, a used function is described explicitly.

The wireless base station 102 is a base station that conforms to a standard of the Institute of Electrical and Electronic Engineers (IEEE) 802.11. That is, the wireless base station 102 executes connection negotiation in response to a connection negotiation request from the first wireless terminal 101. When this connection negotiation is completed, the first wireless terminal 101 performs data communication with various devices connected to the first network 103.

Specifically, the wireless base station 102 establishes a communication path with the first wireless terminal 101 conforming to the IEEE 802.11 standard, and performs authentication with the first wireless terminal 101, if necessary. The wireless base station 102 performs encryption of the communication path with the first wireless terminal 101 and manages the first wireless terminal 101, if necessary. The wireless base station 102 performs data communication with the first wireless terminal 101 via the established communication path and relays data between the first wireless terminal 101 and the first network 103.

The wireless base station 102 performs communication using Internet protocol with various devices connected to the first network 103. The wireless base station 102 has the same function as a communication function of the communication device 104. The function of the wireless base station 102 is not a particular function in the present embodiment, but a function of a general wireless base station.

Meanwhile, the first wireless terminal 101 is a terminal conforming to the IEEE 802.11 standard. The first wireless terminal 101 performs communication with various devices connected to the first network 103 using IP protocol via the wireless base station 102. More specifically, the first wireless terminal 101 conforms to the IEEE 802.11 standard and has the following function. That is, the first wireless terminal 101 searches for a wireless base station conforming to the IEEE 802.11 standard and establishes a communication path with the wireless base station. The first wireless terminal 101 performs authentication between the first wireless terminal 101 and the wireless base station, if necessary, and performs encryption of the communication path between the first wireless terminal 101 and the wireless base station, if necessary. The first wireless terminal 101 also performs data communication with the wireless base station via the established communication path. The first wireless terminal 101 has the same function as the communication function of the communication device 104.

The first wireless terminal 101 performs connection negotiation with the wireless base station 102 using a wireless physical layer when the network communication is performed via the wireless base station 102. In this case, a process such as an authentication process may be additionally performed between the first wireless terminal 101 and the wireless base station 102, if necessary. When the connection negotiation is completed, the first wireless terminal 101 becomes capable of network communication via the wireless base station 102. The first wireless terminal 101 is not particularly limited to such a function in the present embodiment, but may have a function of a general wireless terminal.

The communication terminal 105 has the same function as the communication device 104. The communication terminal 105 transmits a presence check request message to a device connected to the first network 103 using a LAN line or a WAN line. The communication terminal 105 receives a presence check response message to the presence check request message.

Figure 2:
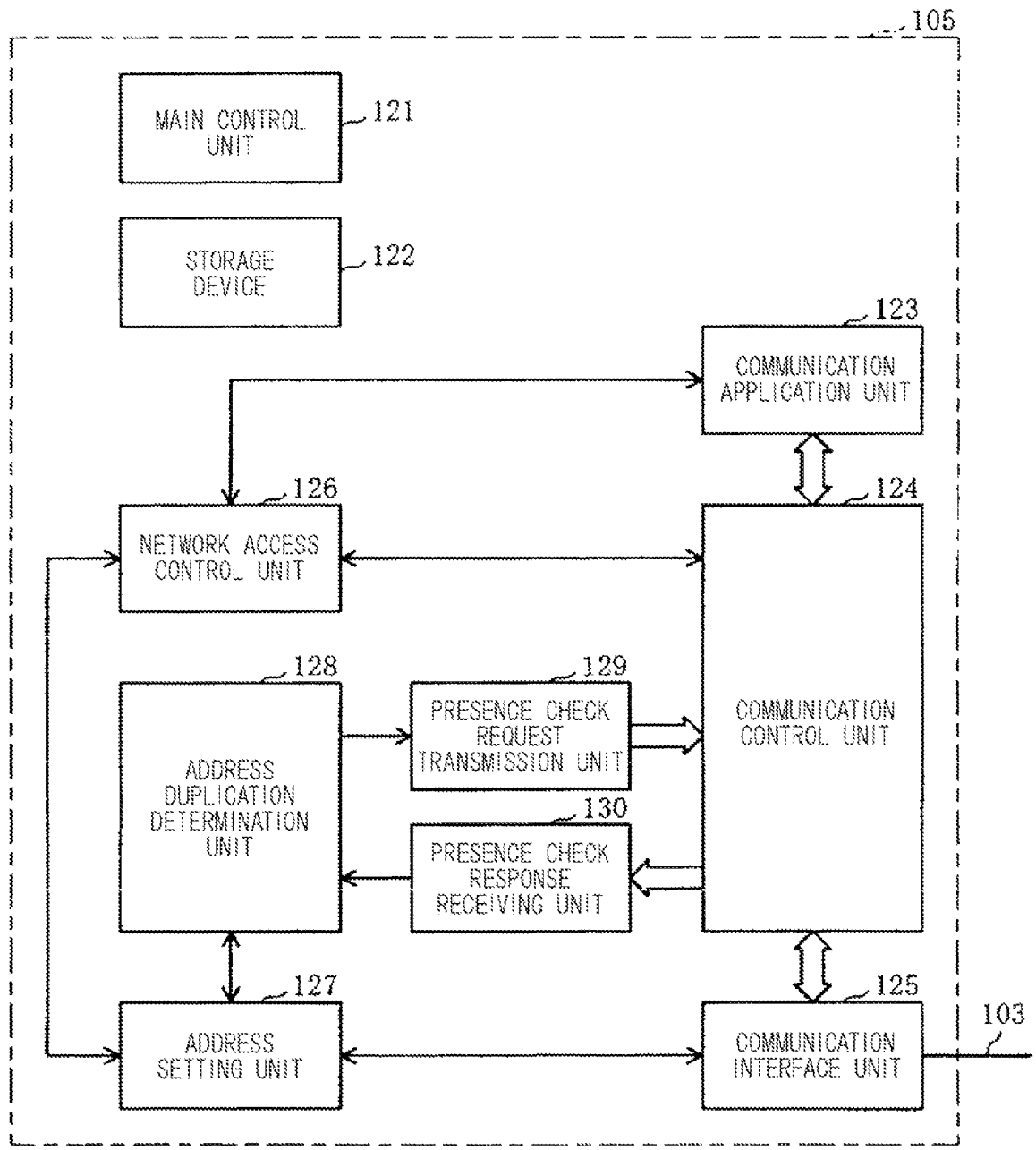
FIG. 2 is a block diagram showing a configuration of a communication terminal in the first embodiment.

FIG. 2 is a block diagram showing a configuration of the communication terminal 105 in the first embodiment. The communication terminal 105 includes a main control unit 121 and a storage device 122. The main control unit 121 includes a central processing unit (CPU) and a semiconductor memory that are not shown. The main control unit 121 executes the control program stored in the storage device 122. Accordingly, the main control unit 121 controls each unit in the communication terminal 105, which will be described hereinafter, and realizes units implemented by software among the units by executing the control program.

The communication terminal 105 includes a communication application unit 123, a communication control unit 124, a communication interface unit 125, a network access control unit 126, an address setting unit 127, an address duplication determination unit 128, a presence check request transmission unit 129, and a presence check response receiving unit 130, in addition to the main control unit 121 and the storage device 122.

The communication application unit 123 is a communication application run on the communication terminal 105, and performs data exchange via the communication control unit 124. The type of the communication application is not particularly limited. Examples of the communication application include a voice communication application, a television telephone application, and an image reception application that require a real-time characteristic. Examples of the communication application also include a mail application and a web browser application that do not require the real-time characteristic. Other communication applications may constitute the communication application unit 123.

The communication control unit 124 is connected to the first network 103 via the communication interface unit 125. The communication control unit 124 performs management of a communication path with various devices connected to the first network 103, and data transmission and reception instruction. More specifically, the communication control unit 124 input/outputs data transmitted and received by the communication terminal 105 from/to a functional unit having a transmission and reception function. Further, the communication control unit 124 outputs data received from the device on the first network 103 via the communication interface unit 125 to each functional unit in the communication terminal, and transmits data received from each functional unit to a corresponding device on the first network 103 via the communication interface unit 125.

The communication interface unit 125 performs data transmission and reception via a wired medium. More specifically, the communication interface unit 125 transmits data output by the communication control unit 124 via a cable, and outputs data received via the cable to the communication control unit 124. Such a communication interface unit 125 determines whether the received data has the MAC address of the communication terminal 103 as a destination or is to be processed by the communication terminal 103 in the case of broadcast and multicast address, and outputs the data to the communication control unit 124.

The network access control unit 126 controls a state of a connection with the network. More specifically, the network access control unit 126 controls connection to and disconnection from the first network 103 with respect to the communication control unit 124. The network access control unit 126 may control initiation and termination of IP data communication. The network access control unit 126 manages a communication connection state or a connection state for the IP data communication.

The network access control unit 126 also controls the MAC address of the communication interface unit 125. More specifically, the network access control unit 126 notifies the address setting unit 127 of the MAC address set for the communication interface unit 125 and requests the address setting unit 127 to set the MAC address. Further, the network access control unit 126 receives the setting result for communication interface unit 125 from the address setting unit 127. When the network access control unit 126 receives the result indicating that the MAC address is duplicated from the address setting unit 127, the network access control unit 126 may notify the address setting unit 127 of another MAC address to set the other MAC address.

The address setting unit 127 sets the MAC address for the communication interface unit 125. More specifically, the address setting unit 127 instructs the address duplication determination unit 128 to check the MAC address duplication based on the MAC address setting request received from the network access control unit 126. When it is determined that the MAC address is not duplicated based on the result from the address duplication determination unit 128, the address setting unit 127 sets the MAC address for the communication interface unit 125. The address setting unit 127 notifies the network access control unit 126 of the setting result. When it is determined that the MAC address is duplicated, the address setting unit 127 notifies the network access control unit 126 that the MAC address is duplicated.

The address duplication determination unit 128 determines whether a device having the MAC address notified by the address setting unit 127 is present on the network. More specifically, the address duplication determination unit 128 acquires the MAC address from the address setting unit 127 and sets the received MAC address as a destination. The address duplication determination unit 128 requests the presence check request transmission unit 129 to transmit a presence check request message together with the MAC address. The address duplication determination unit 128 acquires the result of receiving a presence check response message to the transmitted presence check request message from the presence check response receiving unit 130. When there is the presence check response message, the address duplication determination unit 128 determines that the communication device having the MAC address is present on the same network. When there is no presence check response message, the address duplication determination unit 128 determines that the communication device having the MAC address is not present on the same network.

The address duplication determination unit 128 may have a timeout function. This timeout function regards the case in which there is no presence check response message from the presence check response receiving unit 130 even when a certain time has elapsed after the address duplication determination unit 128 requests the presence check request transmission unit 129 to transmit the presence check request message as timeout. In this case, the address duplication determination unit 128 recognizes that there is no presence check response message at a time which the address duplication determination unit 128 regards as timeout. This timeout value may be held in the address duplication determination unit 128 in advance, or may be specified from the outside, for example, by the network access control unit 126. The timeout value may be stored in a parameter storage unit not shown or may be acquired from the storage device 122 at a given time.

The address duplication determination unit 128 may eventually determine the timeout after performing several retransmissions upon timeout. For example, when the timeout time is one second and there is no response in one second, the address duplication determination unit 128 may perform an operation in which the address duplication determination unit 128 retransmits the presence check request message and waits for a response several times. In this case, the address duplication determination unit 128 performs, for example, the operation three times and then eventually determines timeout, and notifies the address setting unit 127 of the fact.

The presence check request transmission unit 129 transmits the presence check request message with the notified MAC address as a destination via the communication control unit 124. More specifically, the presence check request transmission unit 129 receives the MAC address from the address duplication determination unit 128. The presence check request transmission unit 129 sets the received MAC address as a destination and a MAC address of the communication terminal 105 as a transmission source. The presence check request transmission unit 129 indicates that a payload portion of data link layer data is the presence check request message. The presence check request transmission unit 129 transmits data link layer data exchanged in a data link layer including the presence check request message in the payload portion, via the communication control unit 124. The MAC address of the communication terminal 105 may be held in advance or may be acquired from the communication control unit 124 or the communication interface unit 125. Alternatively, the MAC address may be stored in the above-described parameter storage unit and read from the parameter storage unit.

Figure 3:
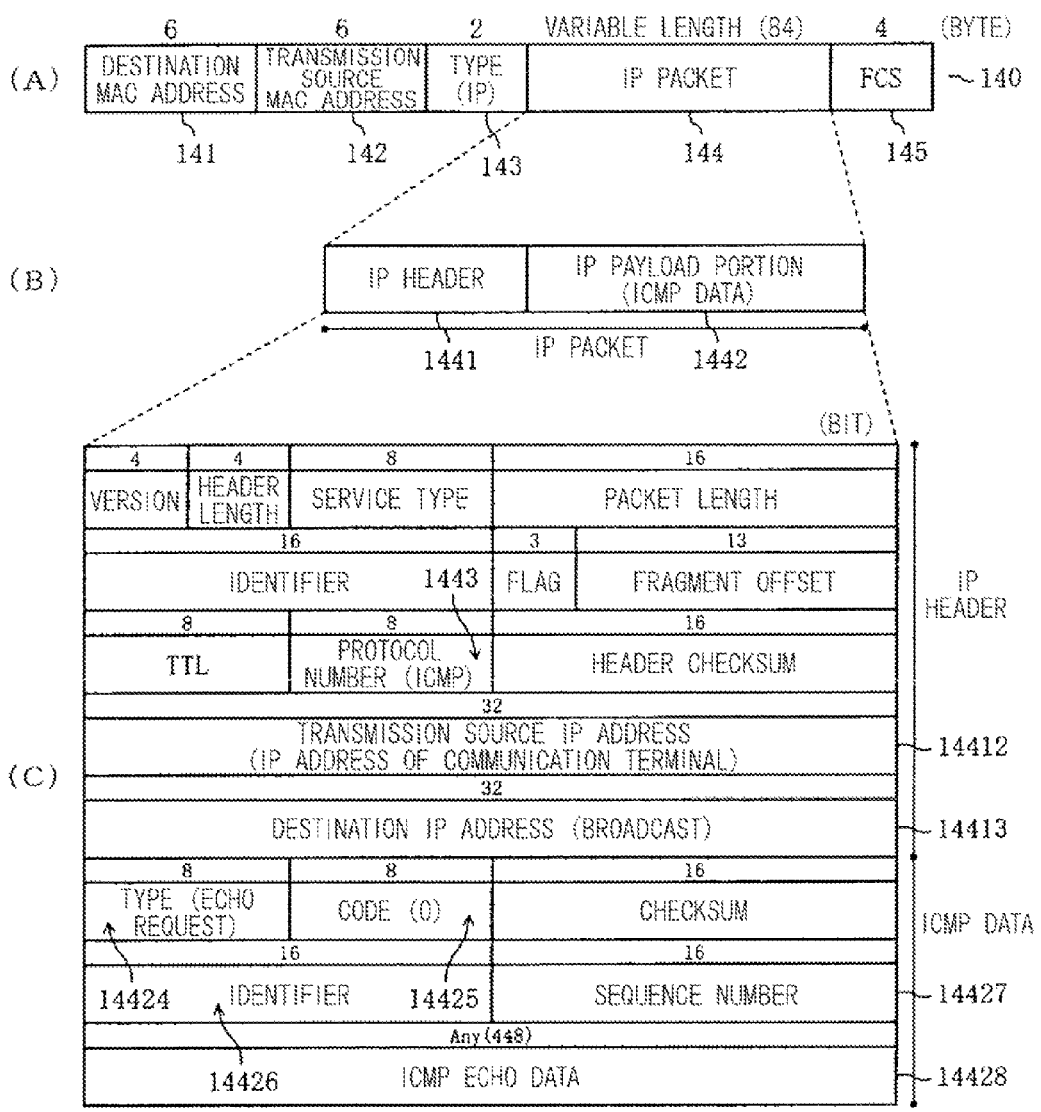
FIG. 3 specifically illustrates a frame structure of a presence check request message in the first embodiment.

FIG. 3 specifically illustrates a frame structure of a presence check request message in the first embodiment. The presence check request message 140 (FIG. 3 (A)) transmitted by the presence check request transmission unit 129 shown in FIG. 2 includes a 6-byte destination MAC address 141, a 6-byte transmission source MAC address 142, a 2-byte type (IP) 143, a variable-length IP packet 144, and a 4-byte frame check sequence (FCS) 145 for error check.

Here, the IP packet 144 includes an IP header 1441 and Internet control message protocol (ICMP) data 1442, as shown in FIG. 3 (B). A detailed configuration of the IP packet 144 is shown in FIG. 3 (C).

A MAC address as a layer 2 address received from the address duplication determination unit 128 in FIG. 2 is used as the destination MAC address 141. Further, a MAC address as a current layer 2 address of the communication terminal 105 is used as the transmission source MAC address 142.

The presence check request message 140 is a packet realized on the IP as shown in FIG. 3, and communicated data is encapsulated in the presence check request message 140. In this presence check request message 140, a transmission source IP address 14412 in the IP header 1441 consists of the IP address of the communication terminal (e.g., "192.168.1.125"). A destination IP address 14413 consists of an IP broadcast address (e.g., "255.255.255.255") as a layer 3 address. A protocol number 1443 indicating the type of an IP payload portion 1442 consists of an ICMP. The IP payload portion 1442 consists of an "ICMP echo request" message. In addition to "255.255.255.255," the broadcast address specified as the destination IP address 14413 may consist of an address "0.0.0.0," or an address such as "192.168.1.255" or "193.168.1.0" when a broadcast in a subnet to which the communication terminal belongs, that is, the IP address of the communication terminal 105, is "192.168.1.125" and the subnetmask is "255.255.255.0." In the case of IPv6, the broadcast address similarly consists of a broadcast address in IPv6. The IP address of the communication terminal 105 may be held in the presence check request transmission unit 129 in advance.

The presence check request message 140 shown in FIG. 3 can be a message realized on the IP, as well as the "ICMP echo request" message. The presence check request message 140 may be request data based on protocol in which a response to a request may be expected. Even in this case, the broadcast address is specified in the destination IP address. Further, the presence check request message 140 can be realized on the data link layer. The presence check request message 140 may be request data based on protocol in which a response to a request may be expected. Even in this case, the transmission source address on the data link layer consists of the MAC address of the communication terminal. The destination address consists of the MAC address received by the address duplication determination unit 128 (FIG. 2).

Referring back to FIG. 2, a description is continued. When data received by the communication interface unit 125 and acquired via the communication control unit 124 is the presence check response message to the transmitted presence check request, the presence check response receiving unit 130 notifies the address duplication determination unit 128 that the presence check response message has been received. More specifically, the presence check response receiving unit 130 acquires the data received by the communication interface unit 125 via the communication control unit 124, and parses the acquired data. The presence check response receiving unit 130 compares the parsed data with a filtering rule held in the presence check response receiving unit 130 in advance. When the data conforms to the rule, the presence check response receiving unit 130 notifies the address duplication determination unit 128 that the presence check response message has been received. When the data does not conform to the rule, the presence check response receiving unit 130 discards the acquired data.

The filtering rule in this presence check response receiving unit 130 is used to extract a presence check response message, which is content of a presence check request message 140, from the presence check request message 140 (FIG. 3 (A)) transmitted from the presence check request transmission unit 129. For example, when the presence check request message 140 transmitted by the presence check request transmission unit 129 is an "ICMP echo request" message, the presence check response message is an "ICMP echo reply" message. The filtering rule is to extract data that is an IP packet transmitted to the communication terminal, in which a value indicating a type of an IP payload portion is "ICMP" and an IP payload portion is an "ICMP echo reply" message. This filtering rule is not limited to the "ICMP echo reply," but may be a rule for extracting a presence check response message corresponding to the presence check request message 140 used in the presence check request transmission unit 129.

When the presence check response receiving unit 130 notifies the address duplication determination unit 128 that the presence check response message has been received, the presence check response receiving unit 130 may notify that the presence check response message has been received. Alternatively, the presence check response receiving unit 130 may assign the presence check response message itself and output the presence check response message to the address duplication determination unit 128.

The storage device 122 includes a memory for storing a control program for realizing a process in each unit in the communication terminal 105, and a memory as a workspace. The main control unit 121 executes the control program in the storage device 122 to perform overall control of the communication terminal 105.

Figure 4:
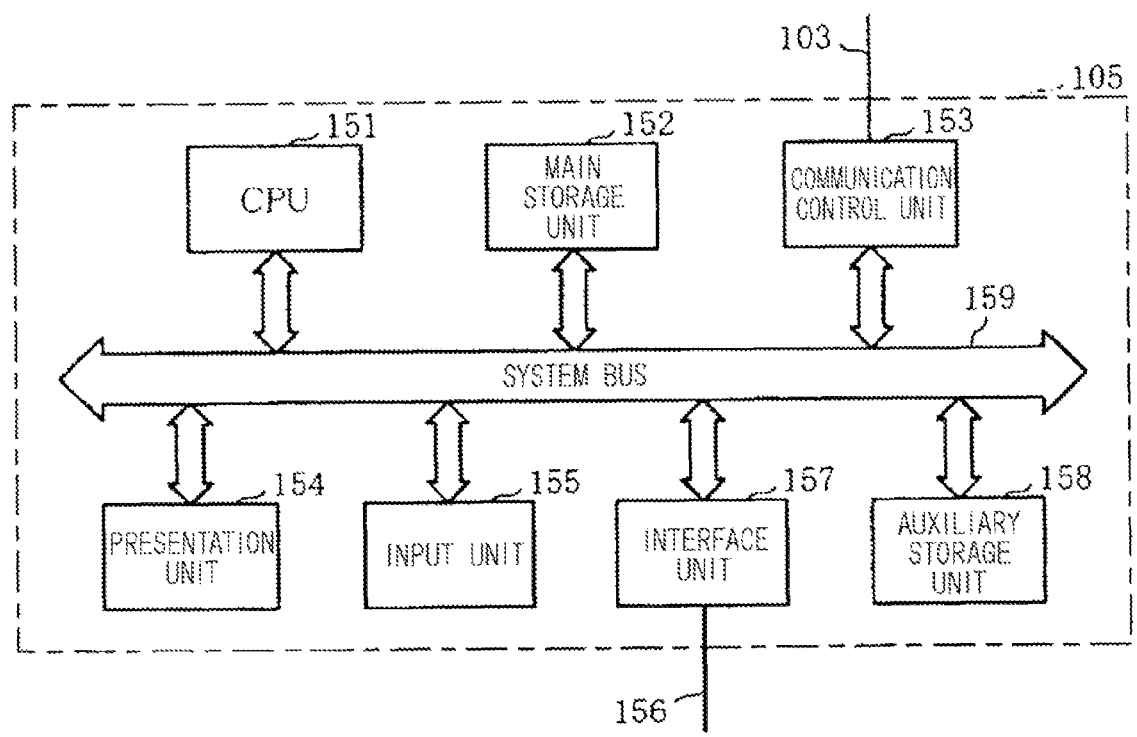
FIG. 4 is a block diagram illustrating a hardware configuration of the communication terminal in the first embodiment.

FIG. 4 is a block diagram illustrating a hardware configuration of the communication terminal 105 in the first embodiment. FIG. 4 shows a circuit configuration including the main control unit 121 and the storage device 122 of FIG. 2. As shown in FIG. 4, the communication terminal 105 of the present embodiment is realized by a hardware configuration similar to a general computer device. Specifically, the communication terminal 105 includes a CPU 151 constituting the main control unit 121 shown in FIG. 2, and a main storage unit 152 constituting the storage device 122. The main storage unit 152 is also used as a data workspace or a temporary data storage area.

The communication terminal 105 includes a communication control unit 153, a presentation unit 154, an input unit 155, an interface unit 157, and an auxiliary storage unit 158, in addition to the CPU 151 and the main storage unit 152.

The communication control unit 153 performs data transmission and reception via the first network 103 shown in FIG. 1 or a wired network. The presentation unit 154, such as an LCD display, a printer, a speaker, or the like, presents information to a user.

The input unit 155 includes a keyboard or a keypad, a pointing device, and so on. The interface unit 157 is connected to a peripheral device not shown by a cable 156 for performing data transmission and reception to and from the peripheral device. The auxiliary storage unit 158 includes a nonvolatile memory, such as a read only memory (ROM), a magnetic disc, an optical disc, a semiconductor memory or the like.

The CPU 151, the main storage unit 152, the communication control unit 153, the presentation unit 154, the input unit 155, the interface unit 157, and the auxiliary storage unit 158 are connected to one another via the system bus 159.

The communication terminal 105 configured as above can be realized by hardware through a hardware part, such as a large scale integration (LSI), mounted therein, in which the hardware part has a control program for realizing various functions. Further, the control program can be executed in the CPU 151 so that all or some of the parts are realized by software.

That is, the CPU 151 can realize various functions by means of software by loading a program stored in the auxiliary storage unit 158 or the storage device 122 to the main storage unit 152 and executing the program to control operation of the communication terminal 105. The first wireless terminal 101 and the wireless base station 102 shown in FIG. 1, as well as the communication terminal 105, have such a similar circuit configuration, which may be realized by hardware or software.

An operation of the wireless communication system 100 in the first embodiment will now be described. The first wireless terminal 101, the wireless base station 102, the communication device 104, the communication terminal 105 and the router 108, which constitute the wireless communication system 100, execute their own control programs.

Figure 5:
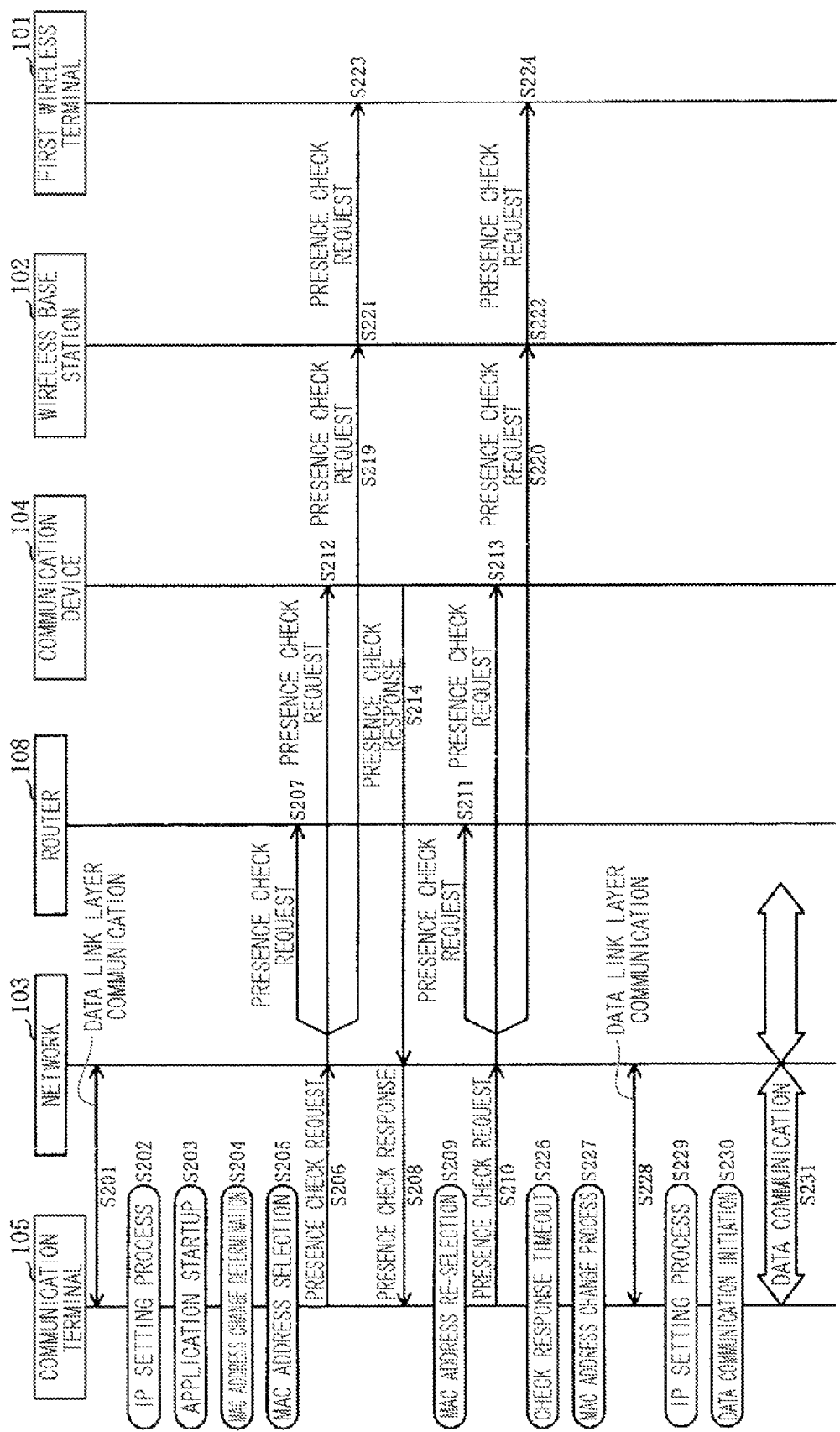
FIG. 5 is a sequence diagram illustrating a process in the wireless communication system with the communication terminal in the first embodiment.

FIG. 5 is a sequence diagram illustrating a process in the wireless communication system 100 with the communication terminal 105 in the first embodiment. FIG. 5 will be described together with FIGS. 1 and 2.

The communication terminal 105 is in a state in which the communication terminal 105 can perform data communication with a device on the first network 103 using a data link layer (step S201). In this state, the communication terminal 105 can perform data communication on the data link layer with the device on the first network 103 using the MAC address of the communication interface unit 125 of the communication terminal 105.

In such a state, the network access control unit 126 and the communication control unit 124 of the communication terminal 105 notify the network access control unit 126 that a connection to the first network 103 has been completed for data communication preparation. Accordingly, the network access control unit 126 recognizes that the network access control unit can perform data communication in the data link layer with the other device connected to the first network 103.

Next, when the connection on the data link layer is completed, the communication terminal 105 sets, for example, an IP address for communication to prepare IP-based data communication (step S202).

When the network access control unit 126 of the communication terminal 105 receives a notification indicating that the connection process on the data link layer is completed from the communication control unit 124, the network access control unit 126 performs given settings of, for example, an IP address necessary for data communication. More specifically, the network access control unit 126 sets, for example, the IP address of the communication terminal 105, subnetmask, default gateway, and dynamic name system (DNS) server address. In this case, when the network access control unit 126 has such information in advance, the network access control unit 126 sets the information. When the network access control unit 126 dynamically acquires the information, the network access control unit 126 executes an IP address information acquisition process and sets the acquired information. Thus, preparation for IP data communication is completed and the communication terminal 105 can perform IP data communication. For example, the IP address of the communication terminal 105 is set to "192.168.1.125" and the subnetmask is set to "255.255.255.0," and the communication terminal 105 can perform the IP data communication using the set IP address and subnetmask.

The communication terminal 105 then determines to change the MAC address in a state in which the communication terminal 105 is connected to the first network 103. In an example, the MAC address may be changed at a time when a communication application unit 123 run on the communication terminal 105 starts up (steps S203 and S204 in FIG. 5).

Figure 6:
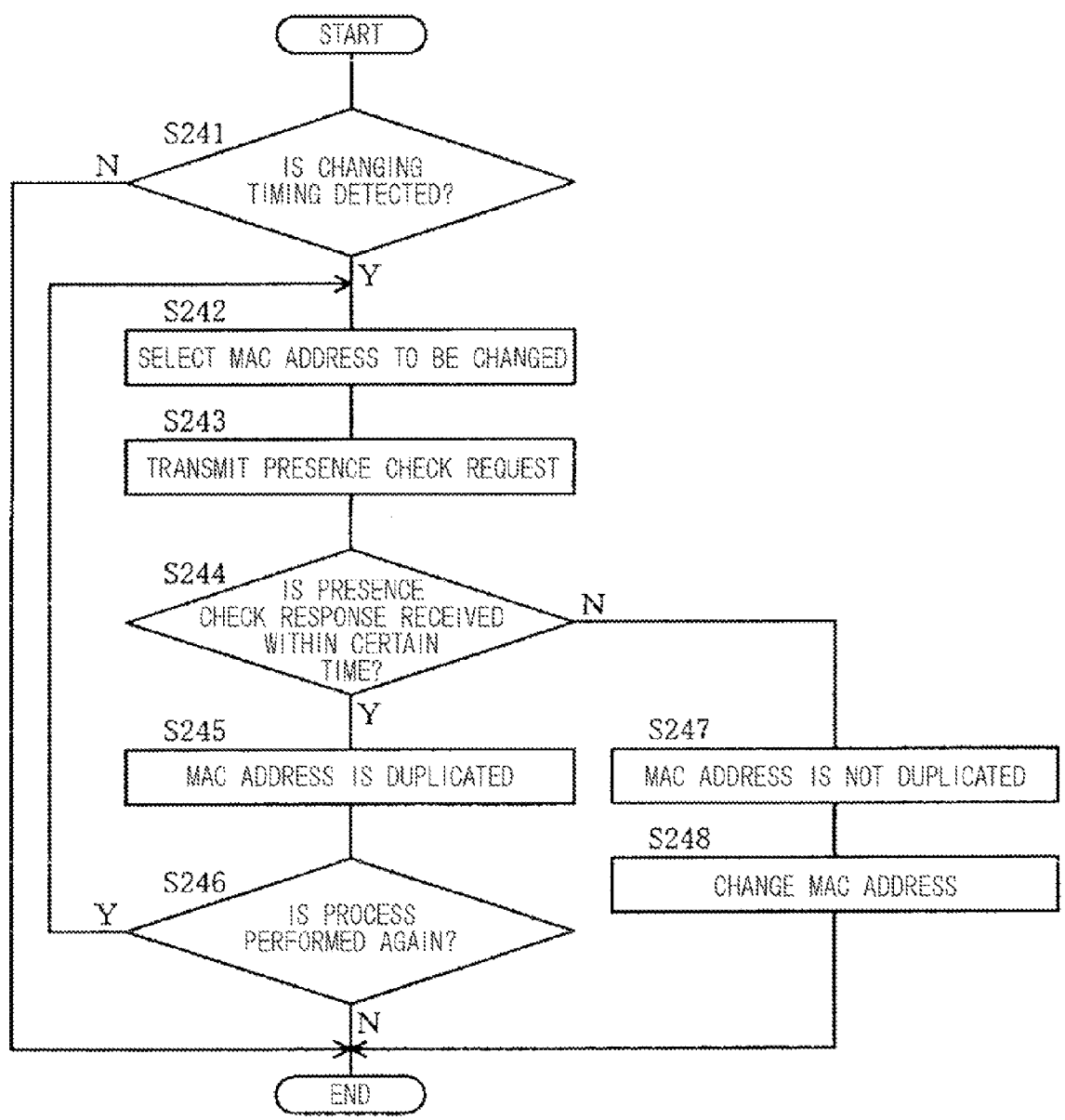
FIG. 6 is a flow diagram specifically showing a process in which the communication terminal changes a MAC address in the first embodiment.

FIG. 6 is a flow diagram specifically showing a process in which the communication terminal 105 changes the MAC address in the first embodiment. FIG. 6 will be described together with FIGS. 1, 2 and 5, as necessary.

When the communication terminal 105 detects a timing as a trigger to change the MAC address (step S241: Y), the communication terminal 105 determines to change the MAC address. The communication terminal 105 selects the MAC address to be changed (steps S242 and S205 in FIG. 5).

The communication terminal 105 then checks that a communication device having the selected MAC address is not present on the network. For this reason, the communication terminal 105 transmits a presence check request message to a device connected to the first network 103 (step S243 in FIG. 6 and step S206 in FIG. 5).

In this case, the network access control unit 126, the address setting unit 127, the address duplication determination unit 128 and the presence check request transmission unit 129 of the communication terminal 105 operate as follows.

First, the network access control unit 126 determines that the MAC address is to be changed in a state in which the communication terminal 105 is connected to the first network 103. The network access control unit 126 selects one MAC address to be changed (step S242 in FIG. 6). The network access control unit 126 requests the address setting unit 127 to change the MAC address and notifies the selected MAC address. For example, when the communication application unit 123 detects that communication is to be initiated, the network access control unit 126 determines that the MAC address is to be changed. The network access control unit 126 selects "00: 00: 4C: 00: 01: 01" as the MAC address to be changed. The network access control unit 126 notifies the address setting unit 127 of the MAC address. For example, when the selected MAC address is "00: 00: 4C: 00: 02: 01," the MAC address is notified. The network access control unit 126 can determine whether the address of the communication interface unit 125 has been successfully changed based on a response from the address setting unit 127.

When the network access control unit 126 detects that the notified MAC address is duplicated with respect to the device on the network (step S245) based on the response from the address setting unit 127 (step S244: Y), the network access control unit 126 may select another MAC address and re-attempt to change the MAC address (step S246).

When the address setting unit 127 receives the MAC address from the network access control unit 126 (step S242), the address setting unit 127 requests the address duplication determination unit 128 to determine whether a communication device having the same MAC address is present on the network (step S243). When it is determined that the MAC address is not duplicated on the network based on the determination result from the address duplication determination unit 128 (step S244: N, step S247), the address setting unit 127 changes the MAC address into a MAC address subjected to the duplication check for the communication interface unit 125 (step S248).

When it is determined that the MAC address is duplicated (step S245), the address setting unit 127 notifies the network access control unit 126 of the result indicating that the MAC address is duplicated, instead of setting the MAC address checked to be duplicated for the communication interface unit 125. When the address setting unit 127 completes setting of the MAC address for the communication interface unit 125, the address setting unit 127 notifies the network access control unit 126 that the setting is completed.

When the address duplication determination unit 128 receives the duplication determination request together with the MAC address from the address setting unit 127, the address duplication determination unit 128 requests the presence check request transmission unit 129 to transmit a transmission check request message and notifies the presence check request transmission unit 129 of the MAC address. When the address duplication determination unit 128 notifies the presence check request transmission unit 129 that the presence check request is to be transmitted, the address duplication determination unit 128 waits for a response from the presence check response receiving unit 130. The address duplication determination unit 128 stores a timeout value for counting timeout, and initiates timeout counting simultaneously when requesting the presence check request transmission unit 129 to transmit the presence check request.

The presence check request transmission unit 129 receives the MAC address together with the presence check request transmission request from the address duplication determination unit 128. The presence check request transmission unit 129 produces a presence check request message with the received MAC address as a destination and the MAC address of the communication terminal as a transmission source. This produced presence check request message is data that indicates that the payload portion of data link, layer data is the presence check request message (see FIG. 3), and is exchanged on the data link layer including the presence check request message in the payload portion. The presence check request message is transmitted to the first network 103 via the communication control unit 124 (step S206 in FIG. 5 and step S243 in FIG. 6). For example, it is assumed that the MAC address "00: 00: 4C: 00: 01: 01" is received from the address duplication determination unit 128. In this case, when this MAC address is specified as a destination and the MAC address of the communication terminal 105 is "00: 00: 4C: 00: 00: 01," the presence check request transmission unit 129 transmits the presence check request message with this MAC address specified as a transmission source. The presence check request message may be held in advance. For example, when the MAC address notified from the address duplication determination unit 128 is "00: 00: 4C: 00: 02: 01," the MAC address becomes a destination.

This presence check request message exchanged on the data link layer through communication between devices directly connected on the first network 103 is structured, for example, as shown in FIG. 3. In FIG. 3, the transmission source IP address 14412 in the IP header 1441 consists of the IP address of the communication terminal 105 (e.g., "192.168.1.125"). The destination IP address 14413 consists of an IP broadcast address (e.g., "255.255.255.255"). A value indicating the type of the IP payload portion 1442 consists of an ICMP. The IP payload portion 1442 consists of an "ICMP echo request" message.

In this case, the router 108, the communication device 104, the wireless base station 102 and the first wireless terminal 101 connected to the first network 103 operate as follows.

When the router 108 receives data via the first network 103, the router 108 determines whether the data is to be processed by the router based on a destination MAC address of the data. When the destination MAC address of the data is directed to the router or a broadcast or multicast address, the router parses the network layer or a transport layer protocol to transmit the data to an appropriate network.

When the destination MAC address of the data is another address, the router discards the received data. That is, it is assumed that the destination MAC address of the data received via the first network 103 is "00: 00: 4C: 00: 01: 01" and a MAC address of an interface of the router is another address, e.g., "00: 00: 4C: 10: 00: 00." In this case, the received data is discarded and not transmitted to the second network 107 (step S207 in FIG. 5). After transmitting the presence check request message to the device connected to the first network 103 in step S206 in FIG. 5, the communication terminal 105 receives the presence check response (step S208). The communication terminal 105 re-selects the MAC address (step S209) and transmits a presence check request message (steps S210 and S211). The same applies to the case in which the MAC address is "00: 00: 4C: 00: 02: 01."

The communication device 104 that receives data from the communication terminal 105 via the first network 103 will now be described. When the communication device 104 receives the data via the first network 103, the communication device 104 determines whether the data is to be processed by the communication device 104 based on the destination MAC address of the data. When the destination MAC address of the data is directed to the communication device 104, the communication device 104 or is a broadcast or multicast address, the communication device 104 identifies a frame type. The communication device 104 outputs the data to a protocol stack adapted to the type and executes the process in the protocol stack.

On the other hand, when the received data is not data to be processed by the communication device 104, the communication device 104 discards the received data. For example, it is assumed that a MAC address assigned to the communication interface of the communication device 104 was "00: 00: 4C: 00: 01: 01." In this case, it is assumed that the destination MAC address of the data received via the first network 103 was "00: 00: 4C: 00: 01: 01." In this example, this MAC address is a MAC address assigned to an interface included in the communication device 104. Here, this data is acquired in the communication device 104, and processed according to the frame type (step S212 in FIG. 5). Since the destination IP address of this presence check request message is specified as a broadcast, the data is treated as IP data to be processed by the communication device 104.

When the communication device 104 receives this presence check request message, the communication device 104 responds with a presence check response message to the transmission source (step S214 in FIG. 5). That is, an "ICMP echo reply" message is transmitted as a response to an "ICMP echo request" message transmitted from the communication terminal 105, to the communication terminal 105, which is a transmission source. In this case, the IP address "192.168.1.125" of the communication terminal 105 that is a transmission source for the "ICMP echo request" message is specified as a destination IP address of the "ICMP echo reply" message. Accordingly, the presence check response message arrives at the communication terminal 105 via the first network 103 (step S208 in FIG. 5).

Meanwhile, it is assumed that the destination MAC address data received by the communication device 104 via the first network 103 is "00: 00: 4C: 00: 02: 01." In this example, this MAC address is not the MAC address assigned to the interface of the communication device 104. Here, the communication device 104 discards the received presence check request message instead of processing the presence check request message (step S213 in FIG. 5).

The wireless base station 102 will now be described. When the wireless base station 102 receives data via the first network 103, like the router 108 and the communication device 104, the wireless base station 102 determines whether the data is to be processed by the wireless base station 102 based on a destination MAC address of the data. As a result, when the destination MAC address of the data is directed to the wireless base station 102 or is a broadcast or multicast address, the wireless base station 102 identifies a frame type. The wireless base station 102 outputs the data to a protocol stack adapted to the type and executes the process in the protocol stack.

When the wireless base station 102 does not receive data to be processed by the wireless base station 102, the wireless base station 102 discards the received data. For example, the MAC address assigned to a communication interface included in the wireless base station 102 is assumed to be "00: 00: 4C: 00: 01: 05." When the destination MAC address of the data received via the first network 103 is "00: 00: 4C: 00: 01: 01," this MAC address is not a MAC address assigned to the interface included in the wireless base station 102. Therefore, the wireless base station 102 discards the received presence check request message instead of processing the presence check request message, (step S219 in FIG. 5). When the wireless base station 102 includes a plurality of communication interfaces, including wireless and wired, the wireless base station 102 determines whether the data is to be processed by the wireless base station 102 by comparing all the communication interfaces. The same applies to the case in which the destination MAC address of the data received via the first network 103 is "00: 00: 4C: 00: 02: 01" (step S220 in FIG. 5).

When the wireless base station 102 receives data via the first network 103, the wireless base station 102 determines a destination port, i.e., a network based on the destination MAC address, and transmits the received data. When the wireless base station 102 recognizes a port to which a device having the MAC address as described above is connected, the wireless base station 102 transmits the received data to the port. When the wireless base station 102 does not recognize such a port, the wireless base station 102 transmits the received data to all ports. Here, the port is intended to be a physically or virtually connected interface unit. That is, in this case, the wireless base station 102 transmits the received data to all wireless terminals connected to the wireless base station 102 (steps S221 and S222 in FIG. 5).

Next, the first wireless terminal 101 will be described. When the first wireless terminal 101 receives data from the communication device connected to the first network 103 via the wireless base station 102, the first wireless terminal 101 determines whether the data is to be processed by the first wireless terminal 101 based on a destination MAC address of the data. When the destination MAC address of the data is directed to the first wireless terminal 101 or is a broadcast or multicast address, the first wireless terminal 101 identifies a frame type to output the data to a protocol stack adapted to the type and executes the process in the protocol stack.

When the received data is not data to be processed by the first wireless terminal 101, the first wireless terminal 101 discards the received data. For example, it is assumed that the MAC address assigned to a communication interface of the first wireless terminal 101 is "00: 00: 4C: 00: 01: 06." When the destination MAC address of the data received via the wireless base station 102 is "00: 00: 4C: 00: 01: 01," this MAC address is not the MAC address assigned to the interface included in the first wireless terminal 101. For this reason, the first wireless terminal 101 discards the received presence check request message instead of processing the presence check request message (step S223 in FIG. 5). The same applies to the case in which the destination MAC address of the data received via the first network 103 was "00: 00: 4C: 00: 02: 01" (step S224 in FIG. 5).

The communication terminal 105 then performs address duplication determination according to the result of receiving a presence check response message to the transmitted presence check request message. Accordingly, the communication terminal 105 can determine whether a first selected and set MAC address is duplicated with respect to the device connected to the network (steps S208 and S226 in FIG. 5 and steps S244 to S246 in FIG. 6). After checking that the MAC address is not duplicated, the communication terminal 105 makes the MAC address valid (step S227 in FIG. 5 and step S248 in FIG. 6).

In this case, the communication control unit 124, the presence check response receiving unit 130, the address duplication determination unit 128, the address setting unit 127, the communication interface unit 125 and the network access control unit 126 of the communication terminal 105 operate as follows.

The communication control unit 124 outputs the data received from the first network 103 to each unit such as the presence check response receiving unit 130. That is, when the communication terminal 105 receives a presence check response message transmitted to the IP address "192.168.1.125" (step S208 in FIG. 5), the communication terminal 105 outputs the presence check response message to the presence check response receiving unit 130.

In this case, the presence check response receiving unit 130 determines whether the reception data received from communication control unit 124 is a response to the presence check request message transmitted from the presence check request transmission unit 129. When the parsed result is the presence check response message, the presence check response receiving unit 130 notifies the address duplication determination unit 128 that the presence check response message has been received.

On the other hand, when the parsed result is not the presence check response message, the presence check response receiving unit 130 discards the received data. That is, when the presence check request message is an "ICMP echo request" message, a filtering rule is set for parsing whether the received data is an "ICMP echo reply" message that is a response to the "ICMP echo request" message. When the presence check response receiving unit 130 receives the "ICMP echo reply" message, the presence check response receiving unit 130 notifies the address duplication determination unit 128 that the presence check response message has been received. In this case, the presence check response receiving unit 130 may notify the address duplication determination unit 128 of the received presence check response message itself together with the fact that the address duplication determination unit 128 has been received.

When the presence check request message is not the "ICMP echo request message," the filtering rule may be set for parsing whether the received data is a corresponding presence check response message. In this case, when the presence check request message is received, the address duplication determination unit 128 may be similarly notified that the presence check request message is received.

When the address duplication determination unit 128 receives the presence check response message from the presence check response receiving unit 130 (step S208 in FIG. 5), the address duplication determination unit 128 determines that a device having the MAC address first notified from the address setting unit 127 is present on the network.

That is, the address duplication determination unit 128 determines that the MAC address is duplicated (step S245 in FIG. 6), notifies the address setting unit 127 of the fact, and resets and stops the first initiated counter. For example, when the MAC address notified from the address setting unit 127 was "00: 00: 4C: 00: 01: 01," the address duplication determination unit 128 receives the presence check response message from the communication device 104. In this case, the address duplication determination unit 128 determines that the MAC address is duplicated, and notifies the address setting unit 127 of the fact.

Meanwhile, when the MAC address notified from the address setting unit 127 is "00: 00: 4C: 00: 02: 01," a presence check response message from another device connected to the first network 103 as well as the presence check response message from the communication device 104 cannot be obtained. When a counter threshold held by the first initiated counter is exceeded (step S226 in FIG. 5), the address duplication determination unit 128 regards the presence check response message as not having been obtained. The address duplication determination unit 128 determines that a device having the MAC address first notified from the address setting unit 127 is not present on the first network 103. That is, the address duplication determination unit 128 determines that the MAC address is not duplicated (step S247 in FIG. 6), notifies the address setting unit 127 of the fact, and resets and stops the first initiated counter.

This counter threshold may be set in the address duplication determination unit 128 in advance or may be stored in a parameter storage unit not shown and read from the parameter storage unit.

The address setting unit 127 can recognize whether the MAC address first requested to the address duplication determination unit 128 is duplicated with respect to the device connected to the network based on the address duplication result from the address duplication determination unit 128. Here, the address setting unit 127 performs the following operation based on the address duplication result.

When the address setting unit 127 receives the result indicating that the MAC address is duplicated from the address duplication determination unit 128, the address setting unit 127 does not set the MAC address for the communication interface unit 125, but notifies the network access control unit 126 of the result indicating that the MAC address is duplicated. For example, when the MAC address notified from the network access control unit 126 is "00: 00: 4C: 00: 01: 01," the address setting unit 127 determines that the MAC address is duplicated with respect to the communication device 104. The address setting unit 127 does not set the MAC address for the communication interface unit 125, but notifies the network access control unit 126 of the result indicating that the MAC address is duplicated.

On the other hand, when the address setting unit 127 receives the result indicating that the MAC address is not duplicated from the address duplication determination unit 128, the address setting unit 127 sets and changes the MAC address for the communication interface unit 125. The address setting unit 127 notifies the network access control unit 126 of the fact. For example, when the MAC address notified from the network access control unit 126 is "00: 00: 4C: 00: 02: 01," the MAC address is not duplicated with respect to any device connected to the network. Accordingly, the address setting unit 127 determines that the MAC address is not duplicated. Here, the address setting unit 127 sets and changes the MAC address for the communication interface unit 125. The address setting unit 127 notifies the network access control unit 126 of the result indicating that the change of MAC address of the communication interface unit 125 is completed (step S227 in FIG. 5 and step S248 in FIG. 6).

The network access control unit 126 can determine whether the change of the MAC address first requested to the address setting unit 127 is completed or the MAC address is duplicated with respect to the device connected to the network based on the result from the address setting unit 127. When the change of the MAC address is completed, the network access control unit 126 may permit data communication to be initiated in a subsequent communication application (step S230 in FIG. 5). When it is determined that the MAC address is duplicated, the network access control unit 126 may perform the same operation with another MAC address again (steps S228 to S231 in FIG. 5).

In the first embodiment described above, the MAC addresses selected by the network access control unit 126 of the communication terminal 105 may be sequentially selected from a previously set MAC address pool. Alternatively, the MAC address may be randomly selected from the previously set MAC address pool. Alternatively, the MAC address may be acquired from the device connected to the network to which the communication terminal 105 is connected. When the MAC address is acquired from the device connected to the network, the MAC address may be acquired with information on the MAC address encrypted and protected.

Effects of the wireless communication system 100 in the first embodiment will be described.

In the first embodiment, the presence check request message transmitted by the communication terminal 105 conforms to protocol that is generally included in a device having a communication function. For this reason, each communication device can be applied to an existing communication network system without needing to have a particular function. Further, the communication terminal can spontaneously perform address duplication check. Therefore, the communication terminal 105 may correspond to only the present embodiment and increased installation cost can be prevented. Furthermore, since there is no need for a device that manages a MAC address, increased management cost can be prevented.

In the first embodiment, before the communication terminal 105 changes the MAC address, the determination is made as to whether the MAC address is duplicated with respect to the device connected to the network. Thus, it is possible to change the MAC address of the communication terminal 105 after checking that the MAC address is not duplicated. Therefore, the communication of the communication device connected to the network is not interrupted due to the duplication.

In the first embodiment, the communication terminal 105 randomly selects a MAC address to be changed from a previously set range when the MAC address is selected. Accordingly, even when there are a plurality of communication terminals to which the present embodiment has been applied, it is possible to achieve a mechanism in which the selected MAC address is difficult to be duplicated. Therefore, even when the MAC address is duplicated, the number of re-performances can be reduced.

In the first embodiment, the communication terminal 105 acquires the MAC address to be changed from the device connected to the network when the MAC address is selected. Accordingly, it is possible to dynamically change the MAC address. It is also possible to assign the MAC address of the device connected to the network so that the MAC address is not duplicated. As a result, the number of re-performances when the MAC address is duplicated can be reduced and the used MAC address is stored, thus achieving a merit in management.

<Second Embodiment>

Figure 7:
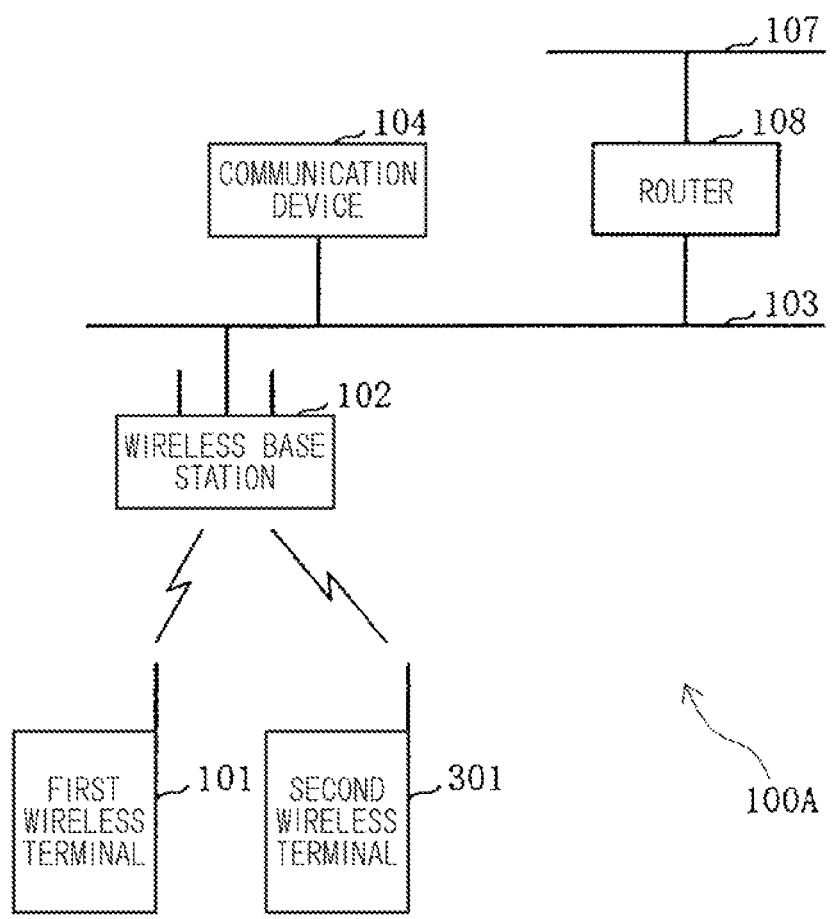
FIG. 7 illustrates a configuration of a wireless communication system in a second embodiment of the present invention.

FIG. 7 illustrates a configuration of a wireless communication system 100A in a second embodiment of the present invention. This wireless communication system 100A includes a first wireless terminal 101, a wireless base station 102, a first network 103, a communication device 104, a second network 107, a router 108, and a second wireless terminal 301. In FIG. 7, the same portions as those shown in FIG. 1 are assigned the same reference numerals, and a description thereof will be omitted.

The wireless communication system 100A includes the second wireless terminal 301 that wirelessly communicates with the wireless base station 102. The second wireless terminal 301 functions as the communication terminal 105 shown in FIG. 1 and has a wireless communication function.

The second wireless terminal 301 in the second embodiment is a terminal conforming to the IEEE 802.11 standard. The second wireless terminal 301 transmits a presence check request message to a device connected to the network via the wireless base station 102. The second wireless terminal 301 receives a presence check response message to the presence check request message.

Figure 8:
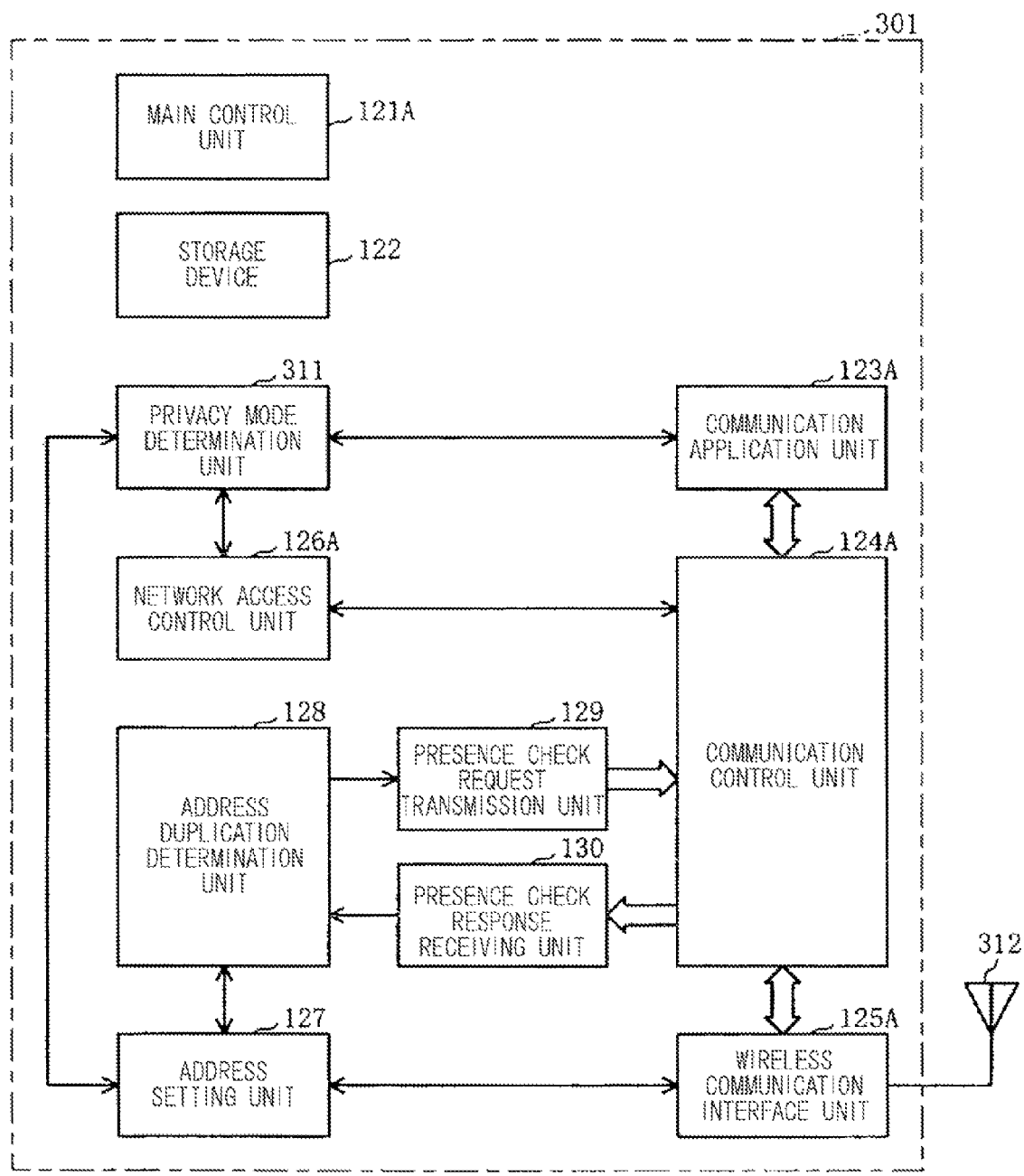
FIG. 8 is a block diagram showing a configuration of a second wireless terminal in the second embodiment.

FIG. 8 is a block diagram showing a configuration of the second wireless terminal 301 in the second embodiment. FIG. 8 corresponds to FIG. 2. In FIG. 8, the same portions as those shown in FIG. 2 are assigned the same reference numerals, and a description thereof will be omitted. FIG. 8 will be described together with FIGS. 2 and 7.

The second wireless terminal 301 includes a communication application unit 123A, a communication control unit 124A, a wireless communication interface unit 125A, a network access control unit 126A, an address setting unit 127, an address duplication determination unit 128, a presence check request transmission unit 129, a presence check response receiving unit 130 and a privacy mode determination unit 311, in addition to the main control unit 121A and the storage device 122.

The main control unit 121A includes a CPU and a memory having a control program stored therein, similar to the main control unit 121 (FIG. 2) in the first embodiment. However, contents of the control program stored in the main control unit 121A have been partially changed to correspond to the wireless communication system 100A in the second embodiment. The communication application unit 123A exchanges data with the network access control unit 126A via the privacy mode determination unit 311, unlike the network access control unit 126 in the first embodiment. Also, the communication control unit 124A has some additional functions. The network access control unit 126A has some additional functions, as well. The second wireless terminal 301 differs from the communication terminal 105 shown in FIG. 1 in that the wireless communication interface unit 125A wirelessly communicates with the wireless base station 102 via an antenna 312.

The privacy mode determination unit 311 dynamically changes a setting timing of a MAC address that is set for the wireless communication interface unit 125A according to a privacy mode of the communication application unit 123A. Specifically, the privacy mode determination unit 311 is notified of the privacy mode from the communication application unit 123A, and determines whether to change the MAC address according to the notified privacy mode. Further, the privacy mode determination unit 311 requests the network access control unit 126 to perform re-connection to the wireless base station 102. Here, the privacy mode is a mode for changing the MAC address to restrict a likelihood of others knowing a conventional MAC address tracing the second wireless terminal 301. This privacy mode is one method of resolving a communication device location privacy issue and an application privacy issue. Usually, the MAC address, i.e., the layer 2 address, is assigned as a value unique to a device. In the wireless communication, since this value is not encrypted and there is no means for preventing a third party from recognizing the value, the third party is likely to unduly recognize device movement information (location privacy). Further, there is a likelihood of the application being speculated from a communication process (application privacy). Here, the MAC address is changed to restrict the likelihood of others tracing the terminal.

The wireless communication interface unit 125A performs data transmission and reception via a wireless medium. Specifically, the wireless communication interface unit 125A wirelessly transmits data received from the communication control unit 124A and outputs wirelessly received data to the communication control unit 124A. The wireless communication interface unit 125A determines whether the received data is directed to a MAC address of the wireless terminal or the data is to be processed by the second wireless terminal 301 when the data is directed to a broadcast and multicast address, and outputs the data to the communication control unit 124A.

The communication application unit 123A, the communication control unit 124A and the network access control unit 126A have some different functions from the functions of the communication terminal 105 in the first embodiment, as described below.

The communication application unit 123A in the second embodiment notifies the privacy mode determination unit 311 of a privacy mode indicating whether privacy is necessary for data communication performed by the communication application unit 123A, in addition to the function of the communication terminal 105 in the first embodiment. Specifically, when the communication application unit 123A initiates data communication requiring privacy protection, the communication application unit 123A recognizes the privacy mode presence and notifies the privacy mode determination unit 109 of the privacy mode. When the communication application unit 123A initiates data communication not requiring privacy protection, the communication application unit 123A recognizes privacy mode absence and notifies the privacy mode determination unit 109 of the privacy mode absence.

The communication control unit 124A in the second embodiment performs management of a communication path with the wireless base station 102 via the wireless communication interface unit 125A, and data transmission and reception instruction, in addition to the function of the communication terminal 105 in the first embodiment. More specifically, the communication control unit 124A searches for the wireless base station 102. The communication control unit 124A transmits a connection request from the wireless communication interface unit 125A to the wireless base station 102 to perform connection negotiation for establishing the communication path with the wireless base station 102. The communication control unit 124A also performs a series of security processes such as data encryption or decoding, and performs data transmission and reception to and from the wireless base station 102 with which the communication path has been established.

The data transmission and reception function in this communication control unit 124A realizes input/output of the data transmitted and received by the second wireless terminal 301 to/from a functional unit requiring a transmission and reception function. Specifically, the communication control unit 124A outputs the data received from the wireless base station 102 via the wireless communication interface unit 125A to each functional unit, and transmits data received from each functional unit to the wireless base station 102 via the wireless communication interface unit 125A.

The communication control unit 124A executes a process of connecting to the wireless base station 102 in response to an instruction from the network access control unit 126A. Specifically, the communication control unit 124A performs a process of connecting to the wireless base station 102 based on a request for connecting to the wireless base station 102 specified from the network access control unit 126. The communication control unit 124A notifies the network access control unit 126A that the connection process is completed at a time when the connection process is completed. The communication control unit 124A also performs a process of disconnecting from the wireless base station 102 based on a disconnection request from the network access control unit 126A.

The network access control unit 126A in the second embodiment includes a function of controlling a state of a connection with the wireless base station 102, in addition to the functions of the communication terminal 105 in the first embodiment. Specifically, the network access control unit 126A acquires the result of searching for the wireless base station 102 from the communication control unit 124A. Further, the network access control unit 126A selects a wireless base station 102 to which the second wireless terminal 301 is connected, based on this search result. The network access control unit 126A controls the communication control unit 124A to execute the process of connecting to the selected wireless base station 102. The network access control unit 126A manages a wireless communication connection state, and performs a re-connection to the wireless base station 102 when receiving a MAC address change completion notification from the privacy mode determination unit 311.

The CPU 151 in the second wireless terminal 301 shown in FIG. 4 moves the control program stored in the storage device 122 to the main storage unit 152 and executes the control program, similar to the communication terminal 105 in the first embodiment. Accordingly, the second wireless terminal 301 performs the above-described process in each unit.

An operation of the wireless communication system 100A in the second embodiment and, particularly, a difference with the wireless communication system 100 (FIG. 1) in the first embodiment, will now be described.

Figure 9:
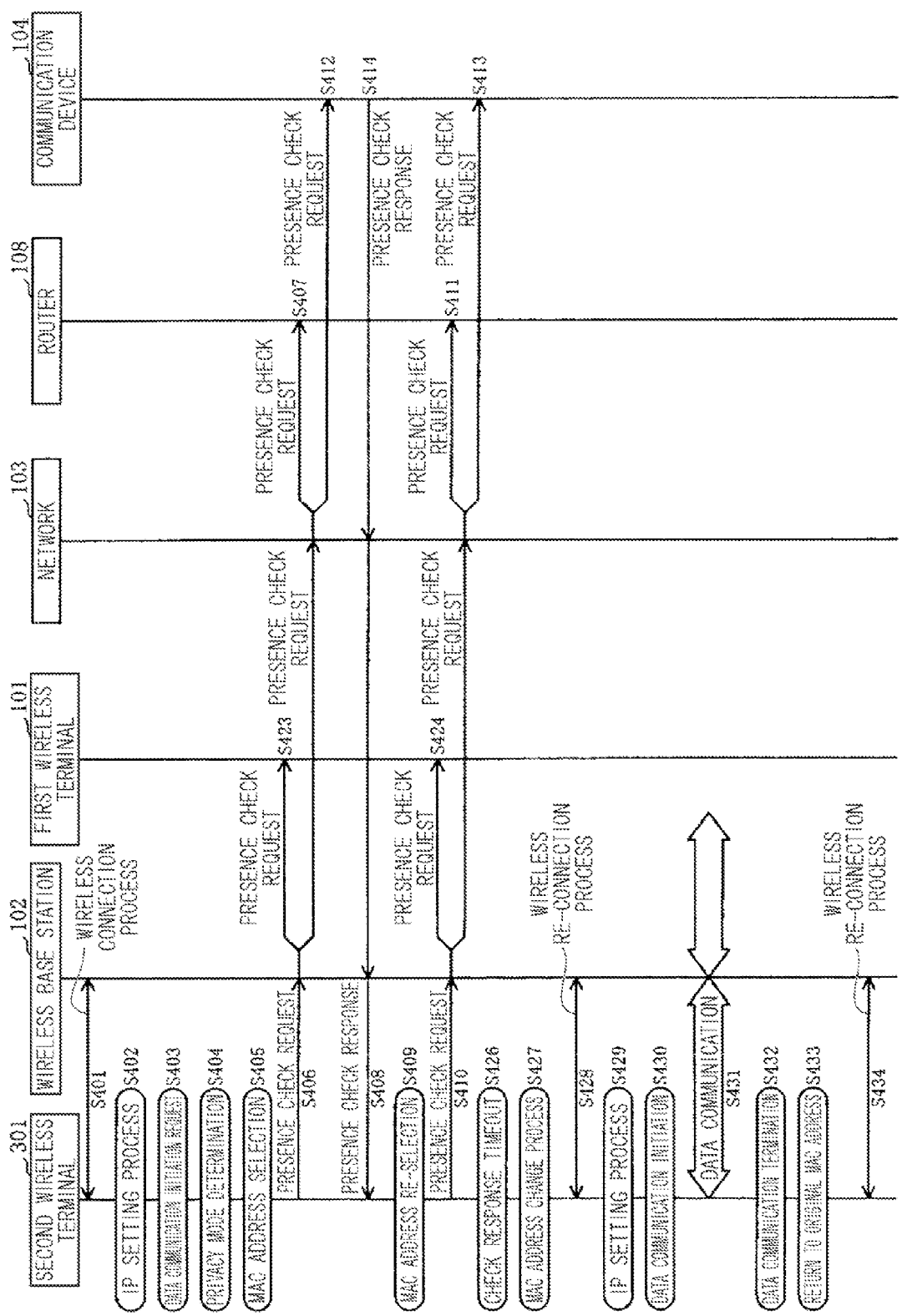
FIG. 9 is a sequence diagram illustrating a process in the wireless communication system with the second wireless terminal in the second embodiment.

FIG. 9 is a sequence diagram illustrating a process in the wireless communication system 100A with the second wireless terminal 301 in the second embodiment. FIG. 9 will be described together with FIGS. 7 and 8.

First, the second wireless terminal 301 performs connection negotiation with the wireless base station 102. This enables the second wireless terminal 301 to perform data communication with a device connected to the first network 103 via the wireless base station 102 (step S401 in FIG. 9). In this case, the second wireless terminal 301 makes a connection request to the wireless base station 102. As a result of the connection negotiation with the wireless base station 102, establishment of a communication path is completed and the second wireless terminal 301 becomes capable of data communication with the wireless base station 102h via the communication path.

For example, the connection negotiation between the second wireless terminal 301 and the wireless base station 102 is IEEE 802.11 connection negotiation. The connection negotiation may be encryption communication using wired equivalent privacy (WEP). Alternatively, the connection negotiation may be encryption communication using a dynamically set WEP key permitted for a connection as a result of IEEE 802.1x authentication. Alternatively, the connection negotiation is a connection with further strengthened security using Wi-Fi protected access (WPA) or WPA version 2 (WPA2) and may be encryption communication using an encryption algorithm called a counter-mode CBC-MAC protocol (CCMP) based on temporal key integrity protocol (TKIP) or advanced encryption standard (AES).

In this case, the network access control unit 126A of the second wireless terminal 301 acquires the result of searching for the wireless base station 102 from the communication control unit 124A. When the network access control unit 126A selects a wireless base station 102 to which the second wireless terminal 301 is to be connected, from the search result, the network access control unit 126A requests the communication control unit 124A to connect to the selected wireless base station 102. The communication control unit 124A performs a process of connecting to the specified wireless base station 102 to execute the process of connecting to the wireless base station 102. When the process of connecting to the wireless base station 102 is completed, the communication control unit 124A notifies the network access control unit 126A that the process is completed.

Next, when the second wireless terminal 301 completes the negotiation with the wireless base station 102, the second wireless terminal 301 sets, for example, an IP address to prepare IP-based data communication (step S402 in FIG. 9). This is the same as the operation in the first embodiment. For example, the IP address of the second wireless terminal 301 is "192.168.1.125," a subnetmask is set to a value such as "255.255.255.0," and IP data communication using the addresses becomes possible.

The case in which the second wireless terminal 301 attempts to change the MAC address of the second wireless terminal 301 according to presence and absence of the privacy mode at data communication initiation and termination timings in the communication application unit 123A, and changes the MAC address will now be described. In this case, the second wireless terminal 301 transmits a presence check request message to the device connected to the first network 103 in order to check that there is no duplication with the device connected to the network (steps S403 to S406 in FIG. 9).

In this case, the communication application unit 123A and the privacy mode determination unit 311 of the second wireless terminal 301 operate as follows.

When the communication application unit 123A initiates data communication according to its privacy policy, the communication application unit 123A notifies the privacy mode determination unit 311 of presence or absence of the privacy mode according to the privacy policy.

Figure 10:
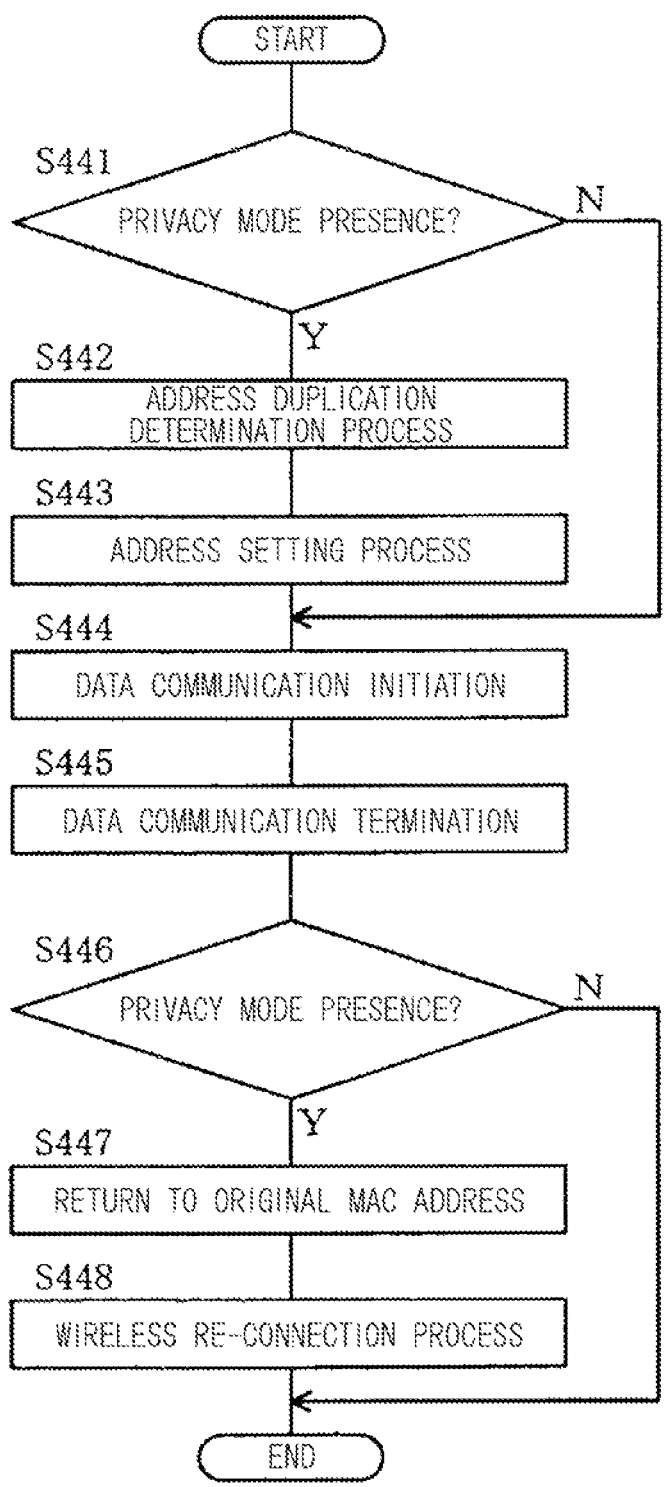
FIG. 10 is a flow diagram showing an operation when the second wireless terminal requests data communication initiation in the second embodiment.

FIG. 10 is a flow diagram showing an operation when the second wireless terminal 301 requests data communication initiation in the second embodiment. When the second wireless terminal 301 initiates the data communication, the privacy mode determination unit 311 determines the presence or absence of the privacy mode based on the above-described notification (step S441). As a result, when the privacy mode presence is determined (step S441: Y), the privacy mode determination unit 311 is notified of the privacy mode presence before the data communication is initiated. After the address duplication determination process and the address setting process (steps S442 and S443 in FIG. 10) are completed, data communication is initiated (step S444 in FIG. 10).

On the other hand, when the privacy mode absence is determined (step S441: N), the privacy mode determination unit 311 is notified of the privacy mode absence before the data communication is initiated, and the data communication is initiated (step S444 in FIG. 10).

The privacy mode determination unit 311 performs a process according to contents of the privacy mode notified from the communication application unit 123A (step S404 in FIG. 9). That is, when the privacy mode determination unit 311 is notified of the privacy mode presence from the communication application unit 123A, the privacy mode determination unit 311 determines that the MAC address is changed in the second wireless terminal 301. The privacy mode determination unit 311 requests the address setting unit 127 to change the MAC address and notifies the address setting unit 127 of the MAC address (steps S442 and S443 in FIG. 10). For example, when the privacy mode determination unit 311 receives the privacy mode presence from the communication application unit 123A according to the communication initiation (step S441: Y), the privacy mode determination unit 311 determines that the MAC address is to be changed. When "00: 00: 4C: 00: 01: 01" is selected as the MAC address to be changed, the privacy mode determination unit 311 notifies the address setting unit 127 of the MAC address. For example, when the selected MAC address is "00: 00: 4C: 00: 02: 01," the privacy mode determination unit 311 notifies the address setting unit 127 of the MAC address. The privacy mode unit 110 can determine whether the address of the wireless communication interface unit 125A has been successfully changed based on the response from the address setting unit 127.

On the other hand, when the privacy mode determination unit 311 is notified of the privacy mode absence from the communication application unit 123A (step S441: N), the privacy mode determination unit 311 determines that the MAC address is not to be changed in the second wireless terminal 301 (step S444 in FIG. 10).

The case in which the privacy mode determination unit 311 determines privacy mode presence (step S441: Y) will now be described. An operation relating to a MAC address duplication check operation in this case until the address setting unit 127, the address duplication determination unit 128 and the presence check request transmission unit 129 of the second wireless terminal 301 transmit the presence check request message is the same as the operation in the first embodiment of the present invention.

In this case, an operation of the router 108, the communication device 104, the wireless base station 102 and the first wireless terminal 101 connected to the first network 103 is the same as the operation in the first embodiment of the present invention (steps S405 to S426 in FIG. 9). That is, when the destination MAC address of the presence check request message transmitted by the second wireless terminal 301 is "00: 00: 4C: 00: 01: 01," the presence check response message is transmitted from the communication device 104 (step S408 in FIG. 9). Further, when the destination MAC address is 00: 00: 4C: 00: 02: 01, the presence check response message is not transmitted from any device connected to the network (step S426 in FIG. 9).

An operation in which the second wireless terminal 301 performs address duplication determination depending on the result of receiving a presence check response message to the transmitted presence check request message to determine whether the MAC address is duplicated with respect to the device connected to the network, and an operation in which the MAC address is made valid after checking that the MAC address is not duplicated are the same as the operations according to the first embodiment of the present invention. Accordingly, a detailed description thereof will be omitted.

In this case, the operation differs from the operation in the first embodiment in that the address setting unit 127 of the second wireless terminal 301 notifies the privacy mode determination unit 311 of the result of setting the MAC address for the wireless communication interface unit 125A and the result of determining MAC address duplication. Other operations, i.e., operations of the communication control unit 124, the presence check response receiving unit 130, the address duplication determination unit 128, the address setting unit 127, and the wireless communication interface unit 125A are the same as the operations according to the first embodiment of the present invention.

The privacy mode determination unit 311 of the second wireless terminal 301 can determine whether the MAC address change first requested to the address setting unit 127 is completed or the MAC address is duplicated with respect to the device connected to the network based on the result from the address setting unit 127. When the MAC address change is completed (step S427 in FIG. 9), the privacy mode determination unit 311 requests the network access control unit 126A to re-connect the wireless base station 102 to which the second wireless terminal 301 is connected (step S428 in FIG. 9). When the re-connection is completed, the privacy mode determination unit 311 notifies the communication application unit 123A that data communication is to be initiated (step S430 in FIG. 9). When the second wireless terminal 301 can connect to a plurality of wireless base stations using different MAC addresses, the second wireless terminal 301 may continue the communication based on the first used MAC address or may disconnect previous communication according to new connection negotiation.

On the other hand, when it is determined that the MAC address is duplicated, the privacy mode determination unit 311 may perform the same operation with another MAC address again. The privacy mode determination unit 311 may repeatedly set the MAC address until it is determined that the MAC address is not duplicated (step S409 in FIG. 9).

The case in which the communication application unit 123A having initiated the data communication in the second wireless terminal 301 terminates the data communication will now be described. In this case, the privacy mode determination unit 311 is notified of the same privacy mode as that notified upon the data communication. Also, the privacy mode determination unit 311 is notified that the data communication is to be terminated (step S432 in FIG. 9 and step S445 in FIG. 10).

When the privacy mode determination unit 311 of the second wireless terminal 301 receives data communication termination together with the privacy mode from the communication application unit 123A, the privacy mode determination unit 311 determines privacy mode presence/absence (step S446 in FIG. 10). When the privacy mode presence is determined (step S446 in FIG. 10: Y), the privacy mode determination unit 311 determines that the privacy mode is to be terminated. In this case, the privacy mode determination unit 311 notifies the address setting unit 127 that the MAC address is to be changed into an original MAC address (step S433 in FIG. 9 and steps S447 and S448 in FIG. 10). The second wireless terminal 301 then performs a wireless re-connection process (step S434 in FIG. 9).

For the privacy mode presence (step S446: Y), the privacy mode determination unit 311 determines that the privacy mode is to be terminated and the currently used MAC address is to be used as it is, and may not request anything to the address setting unit 127.

Alternatively, for the privacy mode presence (step S446: Y), the privacy mode determination unit 311 may determine that the privacy mode is to be terminated, select a new MAC address at that time, and notify the address setting unit 127 that the new MAC address is to be used. In this case, when the setting is completed, an operation in which the network access control unit 126A is requested for re-connection to the wireless base station 102 may be performed, similar to the previously described operation.

When the address setting unit 127 receives a request to return the wireless communication interface unit 125A to an original MAC address from the privacy mode determination unit 311, the address setting unit 127 notifies the wireless communication interface unit 125A of the fact. When the MAC address change is completed, the address setting unit 127 notifies the privacy mode determination unit 311 of the fact.

The address setting unit 127 may separately receive the requests from the privacy mode determination unit 311, i.e., the MAC address duplication determination request and the request to reflect the MAC address to the wireless communication interface unit 125A. In this case, the privacy mode determination unit 311 and the address setting unit 127 operate as follows.

When the address setting unit 127 of the second wireless terminal 301 receives the address duplication determination request together with the MAC address according to the request from the privacy mode determination unit 311, the address setting unit 127 performs MAC address duplication determination by requesting the address duplication determination unit 128 to perform the address duplication determination. The address setting unit 127 notifies the privacy mode determination unit 311 of the determination result. The address setting unit 127 stores a pair of the MAC address and the duplication determination result.

The case in which the address change request together with the MAC address is received will now be described. First, it is checked whether it has been already determined that the MAC address is not duplicated in the duplication determination for the MAC address stored in the address setting unit 127 and the MAC address received based on the duplication determination result. When it has been determined that the MAC address is not duplicated, the MAC address is changed for the wireless communication interface unit 125A. When it has been determined that the MAC address is duplicated and there is no determination result, the privacy mode determination unit 311 may be notified of the result indicating that the MAC address is duplicated or that duplication determination has not been performed. Or, the address duplication determination unit 128 is requested to perform the address duplication determination, and when it is determined that the MAC address is not duplicated in response to the request, the MAC address may be changed for the wireless communication interface unit 125A and then the privacy mode determination unit 311 may be notified of the change. When it is determined that the MAC address is duplicated as a result of requesting the address duplication determination, the privacy mode determination unit 311 may be notified of the result indicating that the MAC address is duplicated.

The privacy mode determination unit 311 of the second wireless terminal 301 may separately make the MAC address duplication check request and the MAC address change request. For example, the privacy mode determination unit 311 may request the address setting unit 127 to check MAC address duplication in advance before receiving the data communication initiation request from the communication application unit 123A, and then may request to change the address into the MAC address that has been first subjected to the duplication check at a time when the privacy mode determination unit 311 receives the data communication initiation request with the privacy mode presence from the communication application unit 123A.

The address setting unit 127 may store a time when the MAC address is determined not to be duplicated, in addition to the MAC address and the MAC address duplication determination result. In this case, the address setting unit 127 receives the MAC address change request from the privacy mode determination unit 311, and compares the time of determination with a previously held expiration date of determination result when the duplication determination result indicates that the MAC address is not duplicated. For this, a timer that, for example, counts from a time when the MAC address is determined not to be duplicated to a time when the expiration date elapses, may be provided. This timer may be used to discriminate whether the expiration date has expired. If it is discriminated that the expiration date has not elapsed after the MAC address is determined not to be duplicated, the same process as the above-described process is performed. If it is discriminated that the expiration date has elapsed after the MAC address is determined not to be duplicated, the discrimination result is determined to be invalid, and the privacy mode determination unit 311 may be notified that the MAC address is duplicated, similar to the operation when the MAC address is duplicated, i.e., it is not determined that the MAC address is not duplicated. Alternatively, the address duplication determination may be performed again and an operation based on the result may be performed.

The second wireless terminal 301 may include a plurality of communication applications. In this case, each communication application performs the same operation as the above-described communication application unit 123A. That is, the privacy mode determination unit 311 maintains the privacy mode for each communication application. In a state of the privacy mode presence, even if one of the privacy mode presence and the privacy mode absence is newly notified of, it does not serve as a trigger to change the MAC address. Meanwhile, when privacy mode termination is notified of according to the data communication termination in the state of the privacy mode presence, the privacy mode determination unit 311 maintains the privacy mode if another state of the privacy mode presence is present. On the other hand, when the state of the privacy mode presence is not present, the privacy mode is terminated. Thus, the second wireless terminal 301 has the function of controlling the privacy mode.

The MAC address selected by the privacy mode determination unit 311 of the second wireless terminal 301 in the second embodiment described above may have the same structure as that selected by the communication terminal 105 in the first embodiment. While the present embodiment particularly exhibits effects in the wireless terminal, the present embodiment may be applied to other communication terminals. The present embodiment may be combined with the first embodiment described above.

Effects of the second embodiment will now be described.

In the second embodiment, it is possible to dynamically change the MAC address change timing according to the data communication state of the communication application and the privacy mode. Accordingly, even when the second wireless terminal connects to the network and is already in a state in which data communication is possible, it is possible to dynamically change the MAC address. As a result, it is possible to improve the privacy characteristic for the data communication of the communication application unit 123A run in the second wireless terminal 301.

In the second embodiment, the address setting unit 127 in the second wireless terminal 301 can receive a MAC address duplication check request and a MAC address reflection request at separate timings. Accordingly, it is possible to check the MAC address duplication in advance. As a result, it is possible to shorten a time taken until the MAC address is actually reflected and to shorten the time by performing the check with another MAC address again in advance even when the MAC address is duplicated. Even in such a case, if the result of the MAC address duplication determination performed in advance is stored, when the MAC address reflection request is received, it is recognized that the MAC address is not duplicated and then MAC address reflection is performed. For this reason, the communication of the communication device connected to the network as described in the first embodiment is not interrupted due to the duplication.

In the second embodiment, a timer is provided, in addition to a pair of the MAC address stored in the address setting unit 127 of the second wireless terminal 301 and the determination result. A determination is made as to whether it is valid or invalid based on the counting result of the timer at a timing when the MAC address is reflected. For this reason, when a certain time elapses after the duplication check, it is possible to make the duplication determination result invalid. As a result, when MAC address duplication determination is made, if there is no duplication with the device connected to the network and a device having the same MAC address is present on the network at a timing when the MAC address is actually reflected, it is possible to reduce a likelihood of negative influences due to, for example, communication interruption.

In the second embodiment, the privacy mode determination unit 311 in the second wireless terminal 301 manages a privacy mode corresponding to each of a plurality of communication applications. For this reason, even when the plurality of communication applications simultaneously operate in the privacy mode presence, it is possible to cope with it. As a result, even when the plurality of communication applications simultaneously operate, it is possible to prevent disconnection from the network during data communication or interruption of the data communication.

<Third Embodiment>

Figure 11:
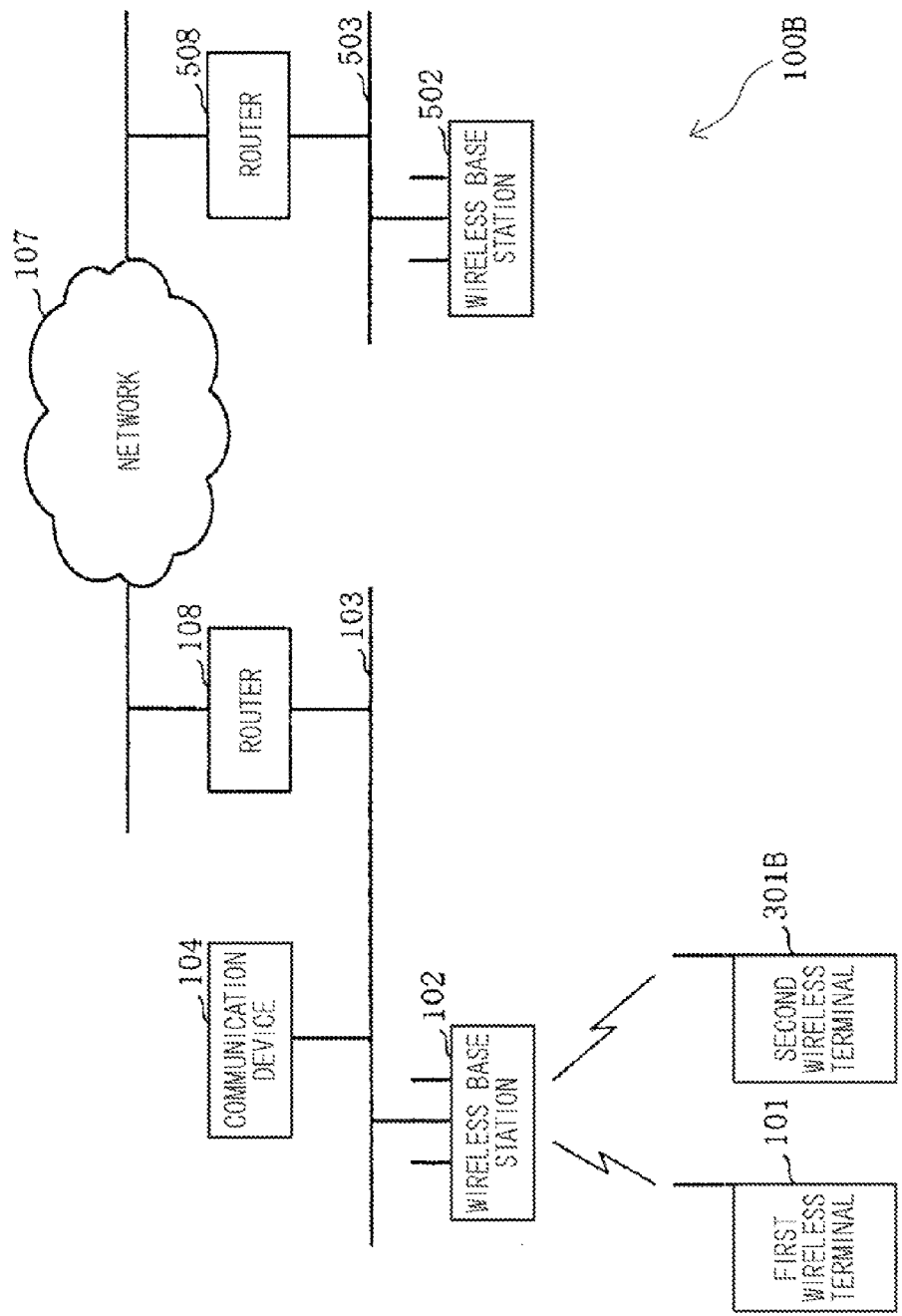
FIG. 11 illustrates a configuration of a wireless communication system in a third embodiment of the present invention.

FIG. 11 illustrates a configuration of a wireless communication system 100B in a third embodiment of the present invention. In FIG. 11, the same portions as those shown in FIG. 7 are assigned the same reference numerals, and a description thereof will be omitted.

The wireless communication system 100B in the third embodiment includes a wireless base station 502, a third network 503, and a router 508, in addition to the configuration of the wireless communication system 100A in the second embodiment shown in FIG. 7.

The third network 503 is connected to a second network 107 via the router 508. The wireless base station 502 is connected to the third network 503. Here, the third network 503 is, for example, built using a LAN line or a WAN line, similar to the first network 103. The router 508 has the same function as the router 108 in the second embodiment shown in FIG. 7. A subnet consisting of the third network 503, and the second network 107 are divided by the router 508. Further, a main control unit 121B, a communication application unit 123B, a network access control unit 126B, a communication control unit 124B and a privacy mode determination unit 311B have functions that are somewhat changed according to the wireless communication system 100B in the third embodiment.

In the third embodiment, the wireless base station 502 has the same function as the wireless base station 102 in the second embodiment shown in FIG. 7. That is, the wireless base station 502 executes connection negotiation according to a connection negotiation request from a wireless terminal. When the wireless base station 502 completes this connection negotiation, the wireless base station 502 relays data communication between the wireless terminal and a device connected to the third network 503.

Figure 12:
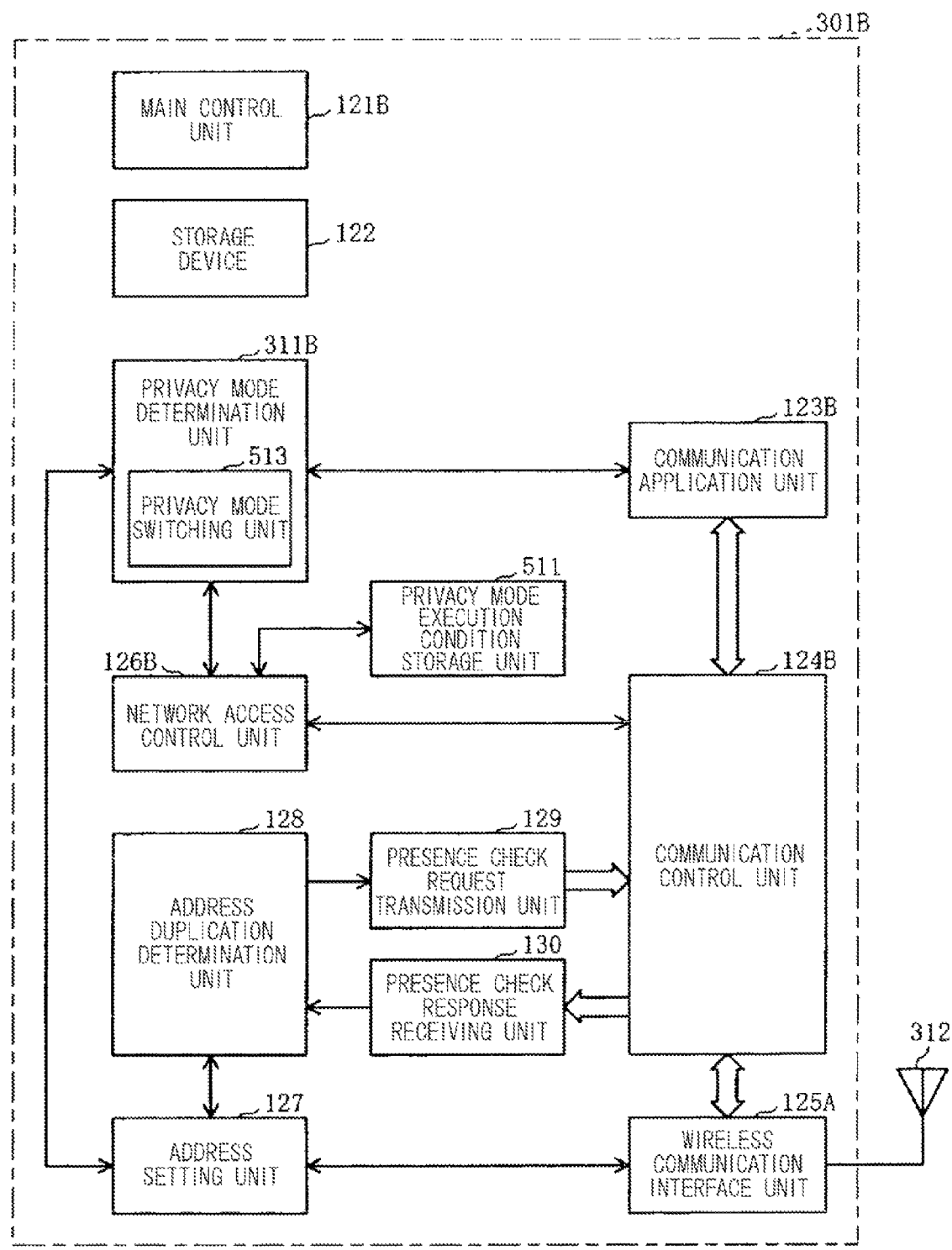
FIG. 12 is a block diagram showing a configuration of a second wireless terminal in the third embodiment.

FIG. 12 is a block diagram showing a configuration of a second wireless terminal 301B in the third embodiment. FIG. 12 corresponds to FIG. 8. In FIG. 12, the same portions as those shown in FIG. 8 are assigned the same reference numerals, and a description thereof will be omitted. FIG. 12 will be described together with FIG. 11.

The second wireless terminal 301B in the third embodiment differs from the second wireless terminal 301A in the second embodiment shown in FIG. 8 as follows. First, the second wireless terminal 301B includes a privacy mode execution condition storage unit 511 for holding a condition that it operates in the privacy mode. The network access control unit 126B in the present embodiment notifies the privacy mode determination unit 311B that a privacy mode is to be switched to on or off according to a network to which the wireless communication terminal is connected and the wireless base station. The privacy mode determination unit 311B includes a privacy mode switching unit 513 for switching whether the privacy mode is made to be valid or invalid. The privacy mode switching unit 513 performs the same operation as in the second embodiment of the present invention when the privacy mode is valid. When the privacy mode is invalid, the MAC address of the wireless communication interface unit 125A is not changed. The second wireless terminal 301B in the third embodiment includes a main control unit 121B for performing overall control of the second wireless terminal 301B.

The privacy mode execution condition storage unit 511 in the second wireless terminal 301B stores a condition that the privacy mode is valid in the second wireless terminal 301B. Specifically, the privacy mode execution condition storage unit 511 stores an identifier relating to a network and a wireless base station operating in the privacy mode when the second wireless terminal 301B is connected. This identifier is used by the network access control unit 126B. For example, the identifier relating to the network and the wireless base station includes a network ID for identifying the network, an "extended service set (ESS) ID" for identifying a group of the wireless base station, and a "basic service set (BSS) ID" or "base station (BS) ID."

The second wireless terminal 301B realizes the above-described process in each unit by the CPU 151 in the main control unit 121B moving the program stored in the storage device 122 to the main storage unit 152 (sec FIG. 4) and executing the program, similar to the second embodiment.

An operation of the second wireless terminal 301B according to the third embodiment and, particularly, a difference with the operation of the first and second embodiments of the present invention will now be described. The process described in the present embodiment is realized by the CPU 151 of the second wireless terminal 301B moving the program stored in the storage device 122 to the main storage unit 152 and executing the program, similar to the first embodiment.

Figure 13:
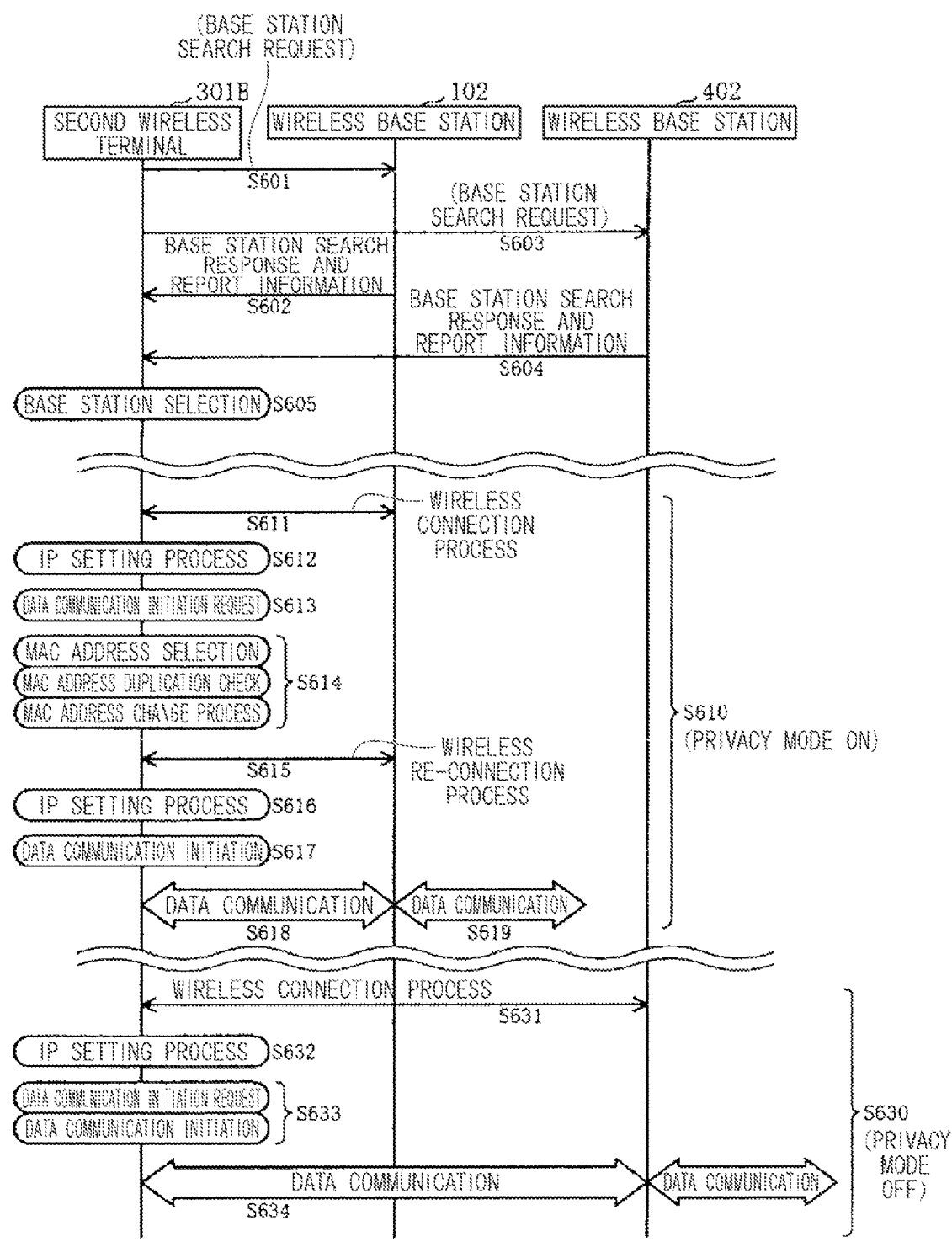
FIG. 13 is a sequence diagram illustrating a process in the wireless communication system with the second wireless terminal in the third embodiment.
Figure 14:
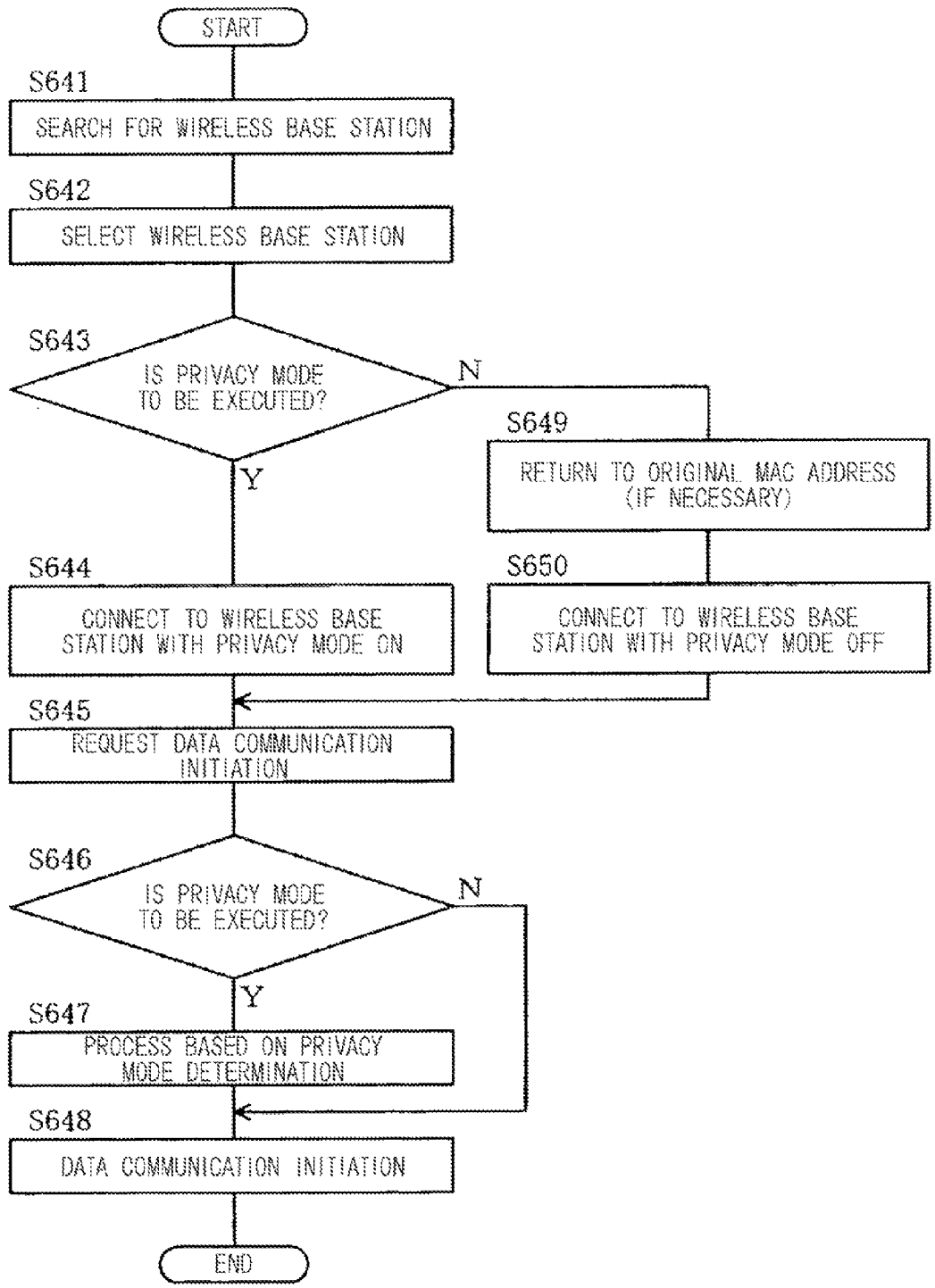
FIG. 14 is a flow diagram showing an operation of a second wireless terminal when network connection is initiated in the third embodiment.

FIG. 13 is a sequence diagram illustrating a process in the wireless communication system 100B with the second wireless terminal 301B in the third embodiment. FIG. 14 is a flow diagram showing an operation of the second wireless terminal 301B when network connection is initiated in the third embodiment. FIGS. 13 and 14 will be described with FIGS. 11 and 12.

The second wireless terminal 301B determines to connect to the wireless base station 502 based on a result of searching for the wireless base station 102 (steps S601 to S604 in FIG. 13 and step S641 in FIG. 14).

The network access control unit 126B of the second wireless terminal 301B determines whether an identifier of the wireless base station to which the second wireless terminal wants to connect is stored in the privacy mode execution condition storage unit 511 (step S642 and S643 in FIG. 14). When the identifier of the wireless base station is stored in the privacy mode execution condition storage unit 511, the network access control unit 126B determines that it may operate in the privacy mode (step S643: Y). The network access control unit 126B requests the privacy mode determination unit 311B to turn the privacy mode on.

On the other hand, when the identifier of the wireless base station is not stored in the privacy mode execution condition storage unit 511, the network access control unit 126B determines that it does not operate in the privacy mode (step S643: N). The network access control unit 126B requests the privacy mode determination unit 311B to turn the privacy mode off. For example, it is assumed that the ESS ID of the wireless base station 102 to which the second wireless terminal wants to connect is "HOME" and "HOME" is stored in the privacy mode execution condition storage unit 511. The network access control unit 126B determines that it operates in the privacy mode, and requests the privacy mode determination unit 311B to turn the privacy mode on. On the other hand, it is assumed that the ESS ID of the wireless base station 502 to which the second wireless terminal wants to connect is "ENTERPRISE" and "ENTERPRISE" is stored in the privacy mode execution condition storage unit 511. The network access control unit 126B determines that it does not operate in the privacy mode and requests the privacy-mode determination unit 311B to turn the privacy mode off.

When the privacy mode determination unit 311B of the second wireless terminal 301B receives the request from the network access control unit 126B to turn the privacy mode on or off, the privacy mode switching unit 513 switches the privacy mode to valid or invalid. That is, when the privacy mode determination unit 311B receives the request to turn the privacy mode on, an operation in the privacy mode is made valid according to the operation of the privacy mode switching unit 513. The MAC address is then changed according to the privacy mode presence or absence from the communication application unit 123B as shown in the second embodiment described above (step S610 in FIG. 13 and steps S644 to S648 in FIG. 14).

On the other hand, when the privacy mode determination unit 311B receives the request to turn the privacy mode off, the operation in the privacy mode is made invalid by the privacy mode switching unit 513. In this case, the MAC address is not subsequently changed (step S630 in FIG. 13 and steps S649, S650, S645, S646 in FIG. 14: N, step S648). When the privacy mode determination unit 311B receives the request to turn the privacy mode off, the address setting unit 127 is requested to cause the wireless communication interface unit 125A to return to an original MAC address (step S649 in FIG. 14). When the process is completed, the privacy mode determination unit 311B notifies the network access control unit 126B of the process completion.

The second wireless terminal 301B then performs connection negotiation to the wireless base station selected in step S605 (steps S611 and S631), and performs a subsequent IP setting process (steps S612 and S632). Accordingly, the second wireless terminal 301B becomes capable of IP data communication with the device on the network via the wireless base station 102 (steps S644 and S650 in FIG. 14). This operation is the same as in the second embodiment.

In this case, the network access control unit 126B of the second wireless terminal 301B waits for a response to the request to turn the privacy mode on or off from the privacy mode determination unit 311B, and performs a connection to a subsequently selected wireless base station or an IP setting process. Accordingly, IP data communication with the device connected to the network becomes possible via the selected wireless base station. For example, when the selected ESS ID indicates the wireless base station 102 of "HOME," the second wireless terminal 301B operates in a state in which the privacy mode is valid (step S610 in FIG. 13). When the selected ESS ID indicates the wireless base station 502 of "ENTERPRISE," the second wireless terminal 301B operates in a state in which the privacy mode is invalid (step S630 in FIG. 13).

The second wireless terminal 301B then attempts to change the MAC address in the second wireless terminal 301B according to the privacy mode presence and absence at a data communication initiation or termination timing in the communication application unit 123B. When the MAC address change is performed, the second wireless terminal 301B transmits a presence check request message to the device connected to the first network 103 to check that there is no duplication with the device connected to the network. The duplication determination and the MAC address change based on the result are the same as those in the second embodiment (steps S613 and S614 in FIG. 13).

That is, when an ESS ID to which the second wireless terminal 301B is connected indicates the wireless base station 102 of "HOME," processes such as MAC address duplication check and change in the second wireless terminal 301B are performed according to privacy mode presence and absence at the data communication initiation or termination timing, as described in the second embodiment (steps S613 and S614 in FIG. 13, and steps S645 to S648 in FIG. 14). On the other hand, when the ESS ID to which the second wireless terminal 301B is connected indicates a wireless base station 502 of "ENTERPRISE," such an operation is not performed and communication is performed using the MAC address of the wireless communication interface unit 125A (steps S633 and S634 in FIG. 13 and steps S645 and S646 in FIG. 14: N, step S648).

Accordingly, the second wireless terminal 301B becomes capable of switching the privacy mode to valid or invalid according to the wireless base station to which the second wireless terminal 301B is connected. The second wireless terminal 301B can determine whether the privacy mode is to be dynamically used according to a use situation. As a result, it is possible to use, for example, both of a situation in which data communication is performed with the MAC address of the wireless communication interface unit 125A as used in a network in an enterprise, and a situation in which data communication is performed after the MAC address is dynamically changed as used in a public network, according to cases.

Following the MAC address change operation (step S614) in the privacy mode presence (step S610), a wireless re-connection process is performed (step S615) and a subsequent IP setting process is performed (step S616). Data communication is performed using the changed MAC address (steps S617 to S619).

The address setting unit 127 of the second wireless terminal 301B in the third embodiment described above performs duplication check, and stores the check result when it is determined that the MAC address is not duplicated. The stored contents as this duplication check result may be deleted when the wireless base station to which the second wireless terminal 301B is connected is switched.

The third embodiment may be combined with one or both of the first and second embodiments.

According to the third embodiment as described above, the privacy mode is switched based on a condition of whether the network access control unit 126B in the second wireless terminal 301B operates in a privacy mode. Accordingly, it is possible to switch a scheme in which the MAC address is used as a fixed one and a scheme in which the MAC address is dynamically changed depending on a network to which the second wireless terminal 301B is connected, and the wireless base station. As a result, the MAC address can be changed in a situation requiring privacy, whereas the MAC address can be used as a fixed one in a situation in which it is undesirable to change the MAC address.

While in the present embodiment, the privacy mode execution condition storage unit 511 stores a condition that the privacy mode is valid in the second wireless terminal 301B, the present invention is not limited thereto. For example, the privacy mode execution condition storage unit 511 may store a condition that the privacy mode is invalid. This is applied to a situation in which the MAC address is used as a fixed one in a specific condition.

<Fourth Embodiment>

Figure 15:
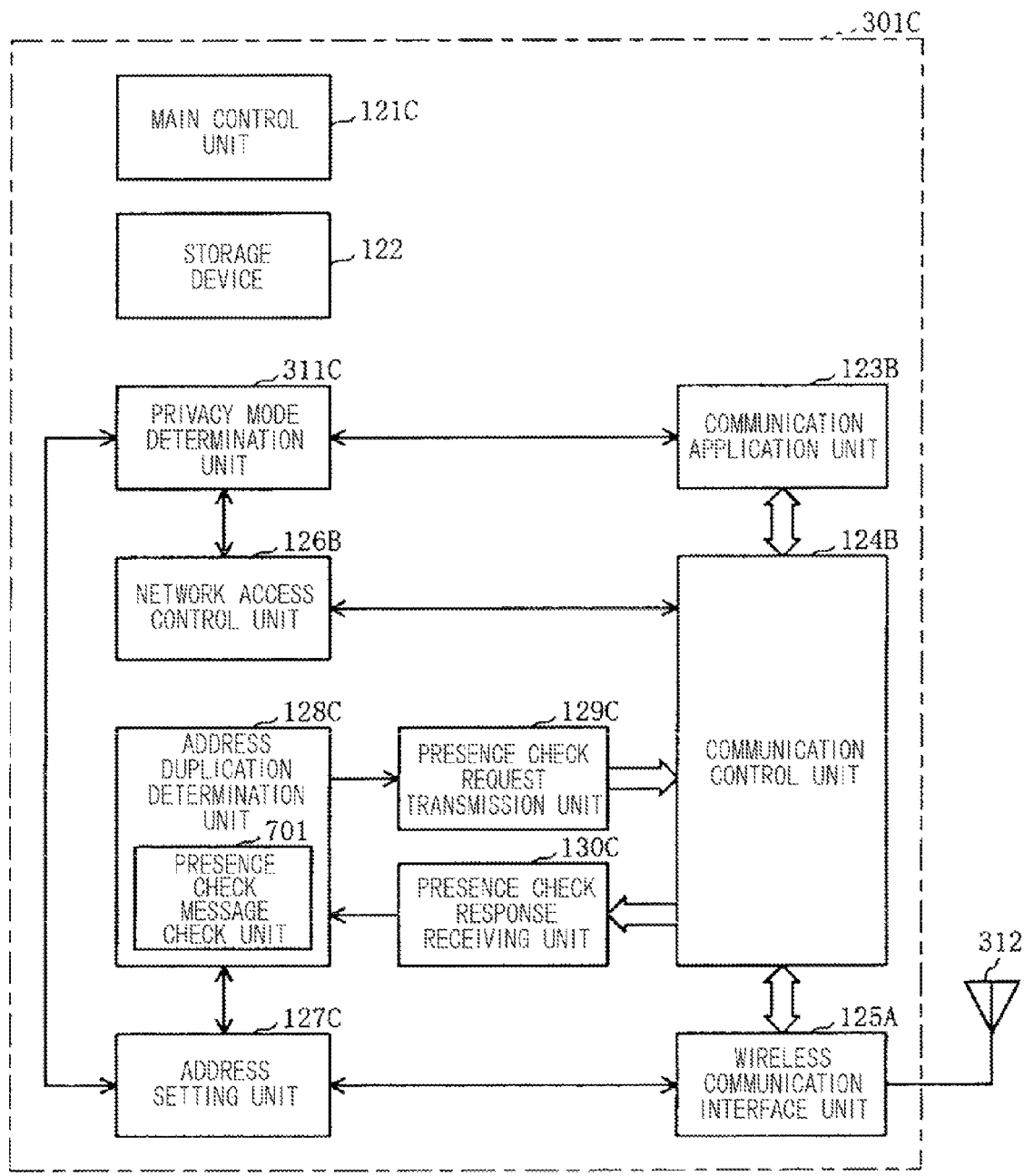
FIG. 15 is a block diagram showing a configuration of a second wireless terminal in a fourth embodiment of the present invention.

FIG. 15 is a block diagram showing a configuration of a second wireless terminal 301C in a fourth embodiment of the present invention. The wireless communication system in the fourth embodiment basically has the same configuration as that shown in FIG. 7. Here, the second wireless terminal 301C in the wireless communication system 100C of the fourth embodiment is substituted for the second wireless terminal 301 in FIG. 7, which is not shown.

The second wireless terminal 301C in the fourth embodiment differs from the second wireless terminal 301 in the second embodiment shown in FIG. 8 in some points. First, an address duplication determination unit 128C of the present embodiment includes a presence check message check unit 701 for identifying a presence check request message and a corresponding presence check response message. A privacy mode determination unit 311C, an address setting unit 127C, the address duplication determination unit 128C, a presence check request transmission unit 129C, and a presence check response receiving unit 130C have some different functions from those in the second embodiment. Other configurations are the same as those of the second wireless terminal 301 in the second embodiment.

The presence check message check unit 701 of the address duplication determination unit 128C checks a presence check request message to which the presence check response message acquired from the presence check response receiving unit 130C corresponds. Specifically, the presence check message check unit 701 determines an identifier for unique identification together with a MAC address and stores a set of the identifier and the MAC address. When the presence check message check unit 701 requests the presence check request transmission unit 129C to transmit a presence check request, the presence check message check unit 701 notifies the presence check request transmission unit 129C of the corresponding identifier together with the MAC address. The presence check message check unit 701 acquires the identifier together with the result of receiving the presence check response message from the presence check response receiving unit 130C. The presence check message check unit 701 performs comparison with the corresponding MAC address based on the identifier.

The presence check message check unit 701 may delete the stored set of the MAC address and the identifier according to the response from the presence check response receiving unit 130C or timeout in the address duplication determination unit 128C. This enables the used identifier to be used newly. That is, a uniquely identifiable value may be uniquely selected from among currently validated identifiers when the uniquely identifiable value is selected.

The privacy mode determination unit 311C, the address setting unit 127C, the address duplication determination unit 128C, the presence check request transmission unit 129C, and the presence check response receiving unit 130C have different functions from those of the second wireless terminal 301 in the second embodiment as follows.

When the privacy mode determination unit 311C in the fourth embodiment selects a MAC address to be changed when attempting to change the MAC address, the privacy mode determination unit 311C simultaneously selects a plurality of MAC addresses. The privacy mode determination unit 311C also requests the address setting unit 127C to check address duplication for the selected MAC addresses. Further, the privacy mode determination unit 311C simultaneously acquires a plurality of determination results while requesting to check the address duplication check. The privacy mode determination unit 311C selects one MAC address from among MAC addresses determined not to be duplicated in the determination result, and requests the address setting unit 127C to change the MAC address. That is, the privacy mode determination unit 311C differs from the privacy mode determination unit 311 in the second embodiment in that the privacy mode determination unit 311C has such functions.

For the request from the privacy mode determination, unit 311C to the address setting unit 127C and the result acquisition, a plurality of requests may be simultaneously made and a plurality of results may be simultaneously acquired. Alternatively, the requests may be sequentially made and the results may be sequentially acquired. Alternatively, they may be combined.

The address setting unit 127C in the fourth embodiment requests the address duplication determination unit 128C to check a plurality of MAC address duplications. This is a difference with the address setting unit 127 in the first and second embodiments.

Next, the address duplication determination unit 128C in the fourth embodiment differs from the address duplication determination unit 128 in the first and second embodiments in that a plurality of address duplication determinations are simultaneously executed. Specifically, the address duplication determination unit 128C determines the result for each MAC address using the presence check message check unit 701. The address duplication determination unit 128C notifies the address setting unit 127C of a pair of the MAC address and the address duplication determination result for the MAC address. The address duplication determination unit 128C may have a timeout value for each MAC address that is being subjected to the address duplication determination. Accordingly, the timeout can be executed at a different timing for each MAC address that is being subjected to the determination, and separate requests can correspond. Further, the address duplication determination unit 128C may simultaneously receive a plurality of requests from the address setting unit 127C or may notify the address setting unit 127C of the address duplication determination results in order of acquisition of the address duplication determination results. Alternatively, the address duplication determination unit 128C may simultaneously notify the address setting unit 127C of a plurality of results.

When the presence check request transmission unit 129C in the fourth embodiment receives a notification indicating that a presence check request message is to be transmitted, the presence check request transmission unit 129C inserts a received identifier together with the MAC address into the presence check request message and transmits the resultant presence check request message. This is a difference between the presence check request transmission unit 129C and the presence check request transmission unit 129 in the first and second embodiments. Specifically, the presence check request transmission unit 129C inserts the identifier at an appropriate position into the presence check request message expected to have the same contents as a presence check request message in the presence check response message. For example, when the presence check request message is an "ICMP echo request" message, the identifier is inserted into an identifier field 14426 (FIG. 3) of the "ICMP echo request" message. Alternatively, the identifier may be inserted into a field 14427 indicating a sequence number (FIG. 3). A field other than the field indicating the identifier and the field indicating the sequence number may be used. For example, a payload portion 14428 of the "ICMP echo request" message (FIG. 3) may be used. Thus, the present embodiment can be realized without a size restriction or a figure limitation in the field indicating the identifier or the sequence number.

While the case in which the presence check request message consists of the "ICMP echo request" message has been described herein, the present invention is not limited thereto. Another message by which the presence check response message can be expected may be used, similar to the "ICMP echo request" message.

When the presence check response receiving unit 130C in the fourth embodiment notifies that the presence check response message has been received, the presence check response receiving unit 130C extracts the identifier included in the presence check response message and notifies of the identifier together with the reception result. This is a difference between the presence check response receiving unit 130C and the presence check response receiving unit 130 in the first and second embodiments. Specifically, the presence check response receiving unit 130C extracts the identifier from an appropriate position of the presence check response message by which a response consisting of the same data as the presence check request message is expected. That is, the presence check response receiving unit 130C extracts the identifier from a position in which the identifier inserted by the presence check request transmission unit 129C is expected to be included in the presence check response message. For example, when the presence check response message is an "ICMP echo reply" message, a field indicating an identifier of the "ICMP echo reply" message is used. Alternatively, a field indicating a sequence number may be used. Alternatively, in the presence check response message, a field other than the field indicating the identifier or the sequence number may be used or a payload portion of the "ICMP echo reply" message may be used.

While the case in which the presence check response message consists of the "ICMP echo reply" message has been described herein, the present invention is not limited thereto. That is, another message may be used as long as the message is the presence check response message to the presence check request message transmitted by the presence check request transmission unit 129C.

The type of a filtering rule corresponding to the type of the presence check request message transmitted by the presence check request transmission unit 129C and the type of the presence check request message determined to be received by the presence cheek response receiving unit 130C may be held in the presence check request transmission unit 129C and the presence check response receiving unit 130C in advance.

Further, the positions of the identifiers specified in the presence check request message and the presence check response message may be held in the presence check request transmission unit 129C and the presence check response receiving unit 130C in advance. Alternatively, such data may be stored in a parameter storage unit not shown and read from the parameter storage unit.

The address duplication determination unit 128C may recognize such types. In this case, the address duplication determination unit 128C may output the presence check request message itself to be transmitted, to the presence check request transmission unit 129C. Also, the presence check response receiving unit 130C may acquire the received presence check response message itself. The address duplication determination unit 128C may compare the presence check request message with the presence check response message.

The second wireless terminal 301C realizes the above-described process in each unit by the CPU 151 of the main control unit 121C (see FIG. 4) moving the program stored in the storage device 122 to the main storage unit 152 and executing the program, similar to the first embodiment.

An operation of the wireless communication system 100C in the fourth embodiment, and particularly, a difference with the operations in the first and second embodiments will now be described.

Figure 16:
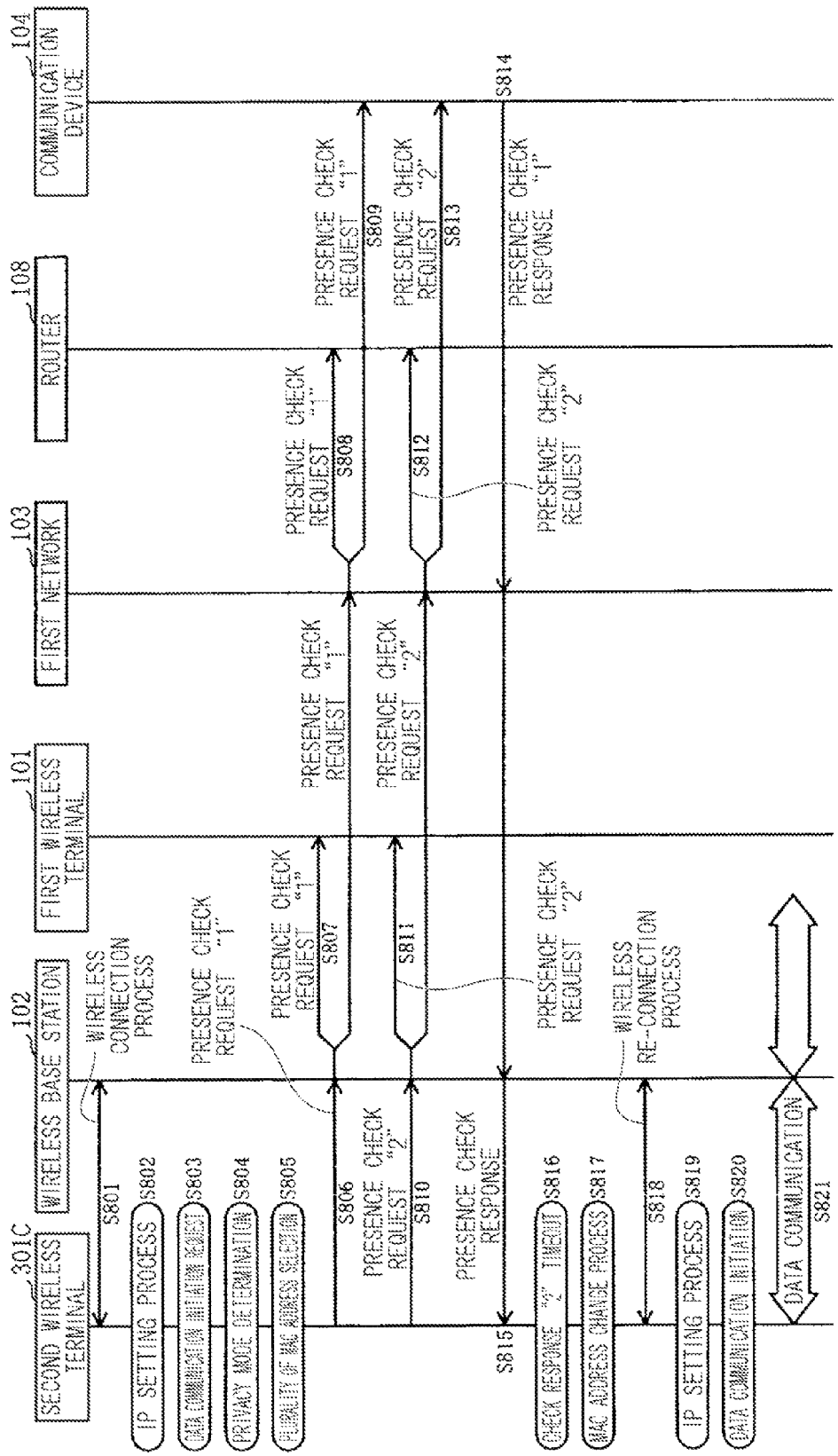
FIG. 16 is a sequence diagram illustrating data transmission and reception in a wireless communication system in the fourth embodiment.

FIG. 16 is a sequence diagram illustrating data transmission and reception in the wireless communication system 100C in the fourth embodiment. Relationships among the second wireless terminal 301C, the wireless base station 102, the first wireless terminal 101, and the router 108 and the communication device 104 connected to the network will be described with reference to FIGS. 3, 4, 7 and 15.

An operation of the wireless communication system 100C in the fourth embodiment is realized by the CPU 151 of the second wireless terminal 301C moving the program stored in the storage device 122 to the main storage unit 152 and executing the program, similar to the first embodiment.

In FIG. 16, the second wireless terminal 301C performs connection negotiation with the wireless base station 102 (step S801), and performs a subsequent IP setting process (step S802). This process enables the wireless terminal 301C to perform IP data communication with a device on the first network 103 via the wireless base station 102. This is the same as in the second and third embodiments.

The second wireless terminal 301C then attempts to change the MAC address in the second wireless terminal 301C according to presence and absence of a privacy mode. This operation is the same as in the second and third embodiments (steps S801 to S804 and S817 to S821 in FIG. 16). However, in the fourth embodiment, as candidates of the MAC address to be changed, a plurality of MAC addresses are selected (step S805 in FIG. 16). The fourth embodiment differs from the second and third embodiments in that the address duplication check is simultaneously performed on the plurality of MAC addresses (steps S806 to S816 in FIG. 16).

In the second and third embodiments, if a plurality of presence check request messages are simultaneously transmitted, it is difficult to identify presence check response messages corresponding to the transmitted presence check request messages. Accordingly, it is necessary to sequentially perform the address duplication determination one by one with respect to the wireless base station. That is, in these embodiments, since a plurality of MAC address candidates are selected in advance assuming that the MAC address is duplicated, address duplication check is performed on all MAC addresses. Accordingly, it takes time for the process to be completed.

On the other hand, in the fourth embodiment, the following operation is performed. Operations of the privacy mode determination unit 311, the address setting unit 127C, the address duplication determination unit 128C, the presence check message check unit 701, the presence check request transmission unit 129C, and the presence check response receiving unit 130C of the second wireless terminal 301C will be described sequentially.

It is assumed that the privacy mode determination unit 311C determines that the MAC address is to be changed in the second wireless terminal 301C (301), for example, according to contents of the privacy mode notified from the communication application unit 123B (123), as described in the second embodiment. In the fourth embodiment, a plurality of candidates of MAC addresses to be changed are selected (step S805 in FIG. 16). For example, "00: 00: 4C: 00: 01: 01" (step S806 in FIG. 16) and "00: 00: 4C: 00: 02: 01" (step S810 in FIG. 16) are selected as the MAC addresses to be changed. In this case, the address setting unit 127C is requested to determine address duplication for all the MAC address. In this case, all the requests may be simultaneously notified or a subsequent request may be made before the result to one request is obtained.

When the address setting unit 127C receives the address duplication determination request from the privacy mode determination unit 311C, the address duplication determination unit 128C performs the address duplication determination on each MAC address. The address setting unit 127C may simultaneously receive a plurality of MAC address duplication check requests or may receive another subsequent request before responding with the result to one request.

When the address duplication determination unit 128C and the presence check message check unit 701 receive a request from the address setting unit 127C to perform address duplication determination, the address duplication determination unit 128C and the presence check message check unit 701 perform the address duplication determination on each received MAC address. The presence check message check unit 701 selects the MAC address and a uniquely identifiable identifier constituting a set with the MAC address, and stores the set. When there are a plurality of received MAC addresses, a uniquely identifiable identifier for each MAC address is selected and similarly stored.

The address duplication determination unit 128C notifies of the MAC address and the assigned identifier, and requests the presence check request message transmission unit 107 to transmit a presence check request message. As a result, when the address duplication determination unit 128C holds a plurality of sets of MAC address and identifier, the address duplication determination unit 128C sequentially notifies the presence check request transmission unit 129C of the sets, and the presence check request messages for all sets are transmitted. When the address duplication determination unit 128C makes a request to the presence check request transmission unit 129C, the address duplication determination unit 128C initiates counting in a counter corresponding to each identifier.

For example, it is assumed that the address duplication determination unit 128C and the presence check Message check unit 701 are notified of two addresses: a MAC address "00: 00: 4C: 00: 01: 01" and a MAC address "00: 00: 4C: 00: 02: 01" from the address setting unit 127C. In this case, the presence check message check unit 701 selects a unique identifier managed for each MAC address. Here, "1" is selected for the MAC address "00: 00: 4C: 00: 01: 01" (step S806 in FIG. 16), and "2" is selected for the other MAC address "00: 00: 4C: 00: 02: 01" (step S810 in FIG. 16), and each is stored. That is, a subsequent transmission request is made to the presence check request transmission unit 129C with a set of the MAC address "00: 00: 4C: 00: 01: 01" and "1" and a set of the MAC address "00: 00: 4C: 00: 02: 01" and "2."

The presence check request transmission unit 129C generates data exchanged on the data link layer based on the MAC address received from the address duplication determination unit 106, similar to the first and second embodiments. However, in the case of the fourth embodiment, the identifier received together is inserted into the data, and then transmission is performed via the communication control unit 124. For example, when the presence check request message consists of an "ICMP echo request" message, the identifier is inserted into an identifier field. That is, when the MAC address "00: 00: 4C: 00: 01: 01" and the identifier "1" are received, "1" is specified in the identifier field. An IP broadcast "ICMP echo request" message in which the destination MAC address consists of "00: 00: 4C: 00: 01: 01" is transmitted (steps S806 to S809 in FIG. 16). On the other hand, when the MAC address "00: 00: 4C: 00: 02: 01" and the identifier "2" are received, "2" is specified in the identifier field. An IP broadcast "ICMP echo request" message in which the destination MAC address consists of "00: 00: 4C: 00: 02: 01" is transmitted (steps S810 to S813 in FIG. 16).

When the presence check response receiving unit 130C determines that the received data is a presence check response message, the presence check response receiving unit 130C notifies the address duplication determination unit 128C (128) of the fact, similar to the first and second embodiments. In the fourth embodiment, the presence check response receiving unit 130C extracts the identifier from the presence check response message. The presence check response receiving unit 130C notifies the address duplication determination unit 128C of the result together with the extracted identifier. That is, when the presence check request transmission unit 129C transmits the request with "00: 00: 4C: 00: 01: 01" as the destination MAC address, the presence check response receiving unit 130C receives the presence check response message (steps S814 and S815 in FIG. 16). The presence check response receiving unit 130C extracts an identifier "1" from the field indicating the identifier and notifies the address duplication determination unit 128C of the identifier "1" together with the fact that the presence check response message has been received. On the other hand, when the presence check request transmission unit 129C transmits the request with "00: 00: 4C: 00: 02: 01" as the destination MAC address, the presence check response receiving unit 130C does not receive the presence check response message.

The address duplication determination unit 128C notifies the address setting unit 127C of the address duplication determination result based on the result from the presence check response receiving unit 130C. Further, when the result from the presence check response receiving unit 130C is not obtained and the time is out, the address duplication determination unit 128C determines that the MAC address is not duplicated with respect to the device connected to the network. This is the same as in the first and second embodiments (step S816 in FIG. 16).

The address duplication determination unit 128C holds a counter for each identifier, receives the result notification from the presence check response receiving unit 130C, determines a MAC address for which a response is obtained based on the identifier, and performs address duplication determination. That is, when the address duplication determination unit 128C receives a notification indicating that the identifier is "1" together with the result indicating that the response has been received from the presence check response receiving unit 130C, the address duplication determination unit 128C determines that the response is a response to the MAC address "00: 00: 4C: 00: 01: 01" based on the information stored in the presence check message check unit 701. The address duplication determination unit 128C then notifies the address setting unit 127C of the determination result indicating that the MAC address has been duplicated together with the MAC address "00: 00: 4C: 00: 01: 01" (step S815 in FIG. 16).

Meanwhile, when the address duplication determination unit 128C does not obtain the reception result indicating that the identifier is "2" from the presence check response receiving unit 130C, and the counter for the identifier "2" is timed out, the address duplication determination unit 128C assumes that there was no response to the MAC address "00: 00: 4C: 00: 02: 01." The address duplication determination unit 128C notifies the address setting unit 127C of the determination result indicating that the MAC address has not been duplicated together with the MAC address "00: 00: 4C: 00: 02: 01"

(step S816 in FIG. 16). After the address duplication determination result is obtained, the set of the MAC address and the identifier for which the result has been obtained may be deleted from the storage area.

The address setting unit 127C notifies the privacy mode determination unit 311C of the above result. Accordingly, the privacy mode determination unit 311C acquires the address duplication determination result for the plurality of previously selected MAC addresses. That is, the privacy mode determination unit 311C can recognize that the MAC address is duplicated with respect to the communication device 104 having the MAC address "00: 00: 4C: 00: 01: 01" and that a device having the MAC address "00: 00: 4C: 00: 02: 01" is connected to the network and the MAC address is not duplicated.

The second wireless terminal 301C sets the MAC address determined not to be duplicated for the second wireless terminal 301C and uses the MAC address. This is the same as the operation in the second and third embodiments. When there are a plurality of MAC addresses determined not to be duplicated, any one of the MAC address may be selected in an order determined at a previously selected time. Alternatively, a MAC address first determined not to be duplicated may be selected.

The fourth embodiment described above may be combined with one or some of the first to third embodiments described above.

In the fourth embodiment, the identifier is assigned to the field expected to have the same value in the presence check request message and the presence check response message. Accordingly, even when a plurality of presence check request messages are simultaneously transmitted, the presence check request messages can be caused to correspond to the presence check response message. As a result, since a plurality of address duplication determinations can be simultaneously executed unlike the case in which the address duplication determination is sequentially executed one by one, it is possible to rapidly obtain the result. This can reduce effects of delay when there are a plurality of devices connected to the network or when a communication application requires a real-time characteristic like a voice communication application. Therefore, the fourth embodiment is particularly effective when sufficient time is not taken until voice communication is initiated.

<Modification of Fourth Embodiment>

Figure 17:
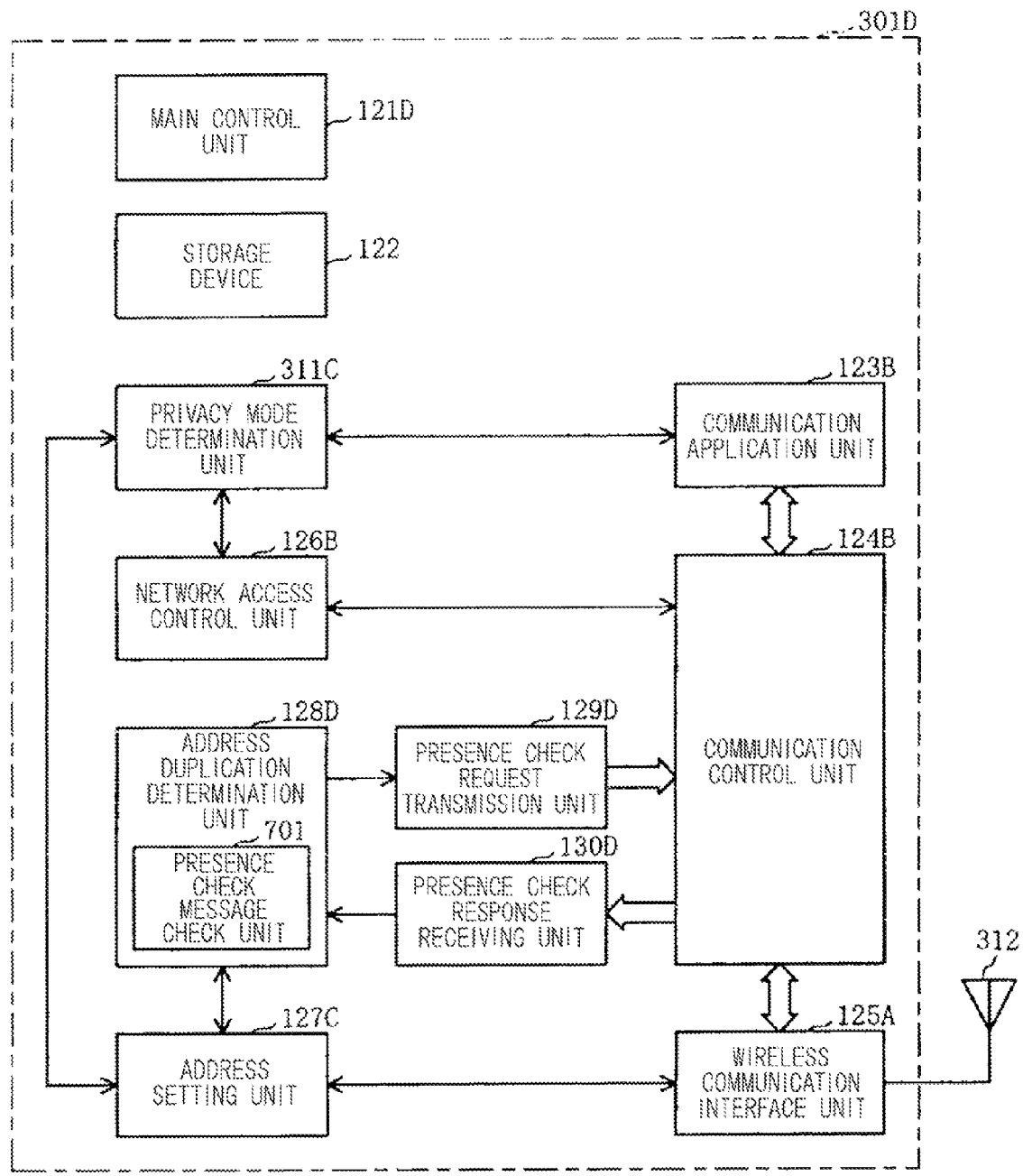
FIG. 17 is a block diagram illustrating a configuration of a second wireless terminal in a modification of the fourth embodiment of the present invention.

FIG. 17 is a block diagram illustrating a configuration of a second wireless terminal 301D in a modification of the fourth embodiment of the present invention. In FIG. 17, the same portions as those shown in FIG. 15 are assigned the same reference numerals, and a description thereof will be omitted.

In the modification of the fourth embodiment, an address duplication determination unit 128D, a presence check request transmission unit 129D, and a presence check response receiving unit 130D perform partially different operations from the corresponding portions in the fourth embodiment. For this reason, the control program executed by the CPU 151 (see FIG. 4) in the main control unit 121D is partially changed.

That is, when the address duplication determination unit 128D in the modification of the fourth embodiment is requested for address duplication check from the address setting unit 127C, the address duplication determination unit 128D performs the address duplication check with a plurality of different presence check messages for one MAC address. In the fourth embodiment, the address duplication check is performed with one type of presence check message, which is a difference between the fourth embodiment and the modification of the fourth embodiment.

The presence check request transmission unit 129D in the modification of the fourth embodiment is then notified of a message type together with the MAC address notified of from the address duplication determination unit 128D, and transmits a different presence check request message according to the notified message type, unlike the fourth embodiment.

Next, when the presence check response receiving unit 130D in the modification of the fourth embodiment receives a presence check response message, the presence check response receiving unit 130D notifies the address duplication determination unit 128D of a message type, in addition to the fact that the presence check response message has been received. This is a difference with the fourth embodiment.

An operation of the wireless communication system in the modification of the fourth embodiment will now be described.

When the address duplication determination unit 128D receives a request for address duplication check from the address setting unit 127C, the address duplication determination unit 128D makes a plurality of requests to the presence check request transmission unit 129D to transmit a presence check request message in which the MAC address is the same and a message type is different. The plurality of requests may be continuously made or a next request may be made after a response to one request is received.

The presence check request transmission unit 129D transmits a presence check message of a specified message type in response to the request from the address duplication determination unit 128D.

When the presence check response receiving unit 130D receives the presence check response message, the presence check response receiving unit 130D notifies the address duplication determination unit 128D of a message type in addition to the fact that the presence check response message has been received.

Next, when there is a presence check response to one of a plurality of presence check request messages having different message types, the address duplication determination unit 128D determines that the MAC address is duplicated with respect to the device connected to the network. If the address duplication determination unit 128D does not receive the presence check response message even when a certain time elapses after the above-described presence check request message is transmitted, the address duplication determination unit 128D determines that the MAC address is not duplicated with respect to the device connected to the network.

Accordingly, in the modification of the fourth embodiment, even when there is no response to the specific presence check request message, another presence check request message may be used. Further, it is possible to expect a response from various communication devices and effects of the present modification in a wider range.

The modification of the fourth embodiment may be combined with one or some of the first to fourth embodiments.

<First Modification of Second Embodiment>

A first modification of the second embodiment of the present invention will be described. While the communication control unit 124A and the wireless communication interface unit 125A shown in FIG. 8 use a wireless LAN (IEEE 802.11) technique, the present invention is not limited thereto. In the first modification of the second embodiment, the communication control unit 124A uses a worldwide interoperability for microwave access (WiMAX) technique according to IEEE 802.16. In this case, it is possible to obtain similar effects as those described in the second embodiment, for a transmission source address of the second wireless terminal 301.

This modification may be applied to the third embodiment, the fourth embodiment and the modification thereof. As a result, the same effects as those in the second embodiment using a wireless LAN (IEEE 802.11) technique, the third embodiment, the fourth embodiment, and the modification thereof are obtained even in the configuration using a WiMAX technique.

The first modification of the second embodiment is realized by the CPU 151 (see FIG. 4) in the main control unit 121A shown in FIG. 8 executing the program stored in the storage device 122.

<Second Modification of Second Embodiment>

A second modification of the second embodiment of the present invention will now be described. In the second wireless terminal 301 shown in FIG. 8, the presence check request message transmitted by the presence check request transmission unit 129 specifies the MAC address acquired as a destination address of the data link layer from the address duplication determination unit 128. In the second modification of the second embodiment of the present invention, a specific IP address is used instead of the MAC address or in addition to the MAC address. In such an IP address, the network layer is formed using an IPv6 protocol. A destination IP address is generated by combining a prefix portion of a network address acquired with a router advertisement message received by the second wireless terminal 301 from the router 108 corresponding to IPv6 with a MAC address acquired from the address duplication determination unit 128.

The second modification of the second embodiment of the present invention may be applied to the first to fourth embodiments, the modification of the fourth embodiment, and the first modification of the second embodiment.

According to the second modification of the second embodiment of the present invention, a presence check message with a specific IP address can be formed as a destination. Using a transmission control protocol (TCP) other than a user datagram protocol (UDP), it is possible to check the presence of a communication device having a relevant MAC address. In this case, it is possible to use, for example, a feature of connection type communication using TCP. For example, it is possible to perform the presence check using a response that is a combination between an acknowledgement (ACK) to a SYN message initially transmitted to a connection object in order to establish a connection and the SYN message or a response by a reset message.

The second modification of the second embodiment is realized by the CPU 151 (FIG. 4 see) in the main control unit 121A shown in FIG. 8 executing the program stored in the storage device 122.

In a conventional technique, layer 2 address collision avoidance is generally realized through layer 2 address duplication detection in which layer 2 address collision with a communication device connected to a network can be detected only passively, or by providing, on the network, a communication device that stores and manages the layer 2 address of the communication device connected to the network in advance.

In each embodiment of the present invention, the check request message with the selected layer 2 address as the destination is transmitted via the network before the communication terminal uses the address without providing, on the network, a communication device that manages layer 2 address information of all communication devices connected to the network in advance. Accordingly, it is recognized whether the selected layer 2 address is not duplicated with respect to a communication device connected to a network.

Therefore, according to each embodiment of the present invention, it is possible to provide a communication device, a communication method and a communication control program in which the communication device can spontaneously check the duplication of a used address in advance without needing to prepare a particular server or an equivalent device and without affecting existing communication devices present on the network.

According to each embodiment of the present invention, it is also possible to provide a communication device, a communication method and a communication control program capable of changing the address of the communication device without affecting existing communication devices present on the network.

According to each embodiment of the present invention, it is also possible to provide a communication device, a communication method, and a communication control program capable of changing a setting timing of the MAC address according to an operation mode of an application run in the communication device.

According to each embodiment of the present invention, it is also possible to provide a communication device, a communication method, and a communication control program capable of switching one of a dynamically changeable MAC address and a statically set MAC address according to a network to which the wireless communication terminal is wirelessly connected.

While the present invention has been described with respect to some embodiments and modifications, the present invention is not necessarily limited to the embodiments or modifications, but various variations may be made to the present invention without departing from the spirit and scope of the present invention.

For example, while a wireless LAN (IEEE 802.11) technique is used in the embodiments and the modifications, the present invention is not limited thereto, but various techniques such as Bluetooth, ultra wide band (UWB), and 3rd generation (3G) may be used. Thus, the present invention can be applied when a communication terminal performs data communication in a network system requiring a communication terminal having a communication interface. In particular, the present invention can be suitably used in a situation in which enhanced privacy characteristic is necessary in a communication in a wireless section, like a wireless terminal.

While the various embodiments of the present invention have been described, they will be compared with the third related technique described above.

In the third related technique, a message with a broadcast or multicast that is a layer 3 address as a destination and with a broadcast or multicast as the destination even in the layer 2 address is transmitted. Here, the layer 3 address is inserted into the payload portion of the message.

Meanwhile, each embodiment of the present invention is the same in message structure as the third related technique in that the message with the broadcast or the multicast, which is the layer 3 address, as a destination is transmitted. However, in each embodiment of the present invention, the message with a layer 2 address selected by a means for selecting the layer 2 address, as the destination, is transmitted instead of being broadcast.

Thus, the third related technique and each embodiment of the present invention have different payload portion structures. However, they also have different layer 2 address portions. In the third related technique, layer 3 address (IP address) duplication is detected. On the other hand, in each embodiment of the present invention, layer 2 address duplication is detected.

Such differences in configuration appear as a difference in operation between the third related technique and each embodiment of the present invention. That is, in the third related technique, a message arrives at all devices in a layer 2 level and a layer 3 level. For this reason, each of a plurality of devices receiving the message determines whether to respond to the message based on contents of a payload of the communication device.

On the other hand, in each embodiment of the present invention, the message arrives at a device specified as the destination in the layer 2 level. Therefore, a specific device having received this message responds to this message.

Industrial Applicability

The present invention can be applied to a communication device, a communication method, a communication control program, and the like in which the communication device can spontaneously execute a duplication check for a used address in advance without preparing a particular server or an equivalent device and without affecting existing communication devices present on the network.

The invention claimed is:

1. A communication device comprising:
   an address selection unit which selects a layer 2 address that is a change candidate for the communication device;
   a presence check request generation unit which generates a presence check request message, the presence check request message storing, in a destination layer 2 address storage area, only the layer 2 address selected by the address selection unit, the presence check request message storing, in a transmission source layer 2 address storage area, a current layer 2 address of the communication device, the presence check request message storing, in a destination layer 3 address storage area, at least one of a broadcast address and a multicast address;
   a presence check request transmission unit which transmits the presence check request message generated by the presence check request generation unit via a network to which the communication device is connected;
   a presence check response receiving unit which receives a presence check response message to the presence check request message via the network to which the communication device is connected;
   an address duplication determination unit which determines that a communication device having the layer 2 address selected by the address selection unit is present on the network when it is discriminated that there is the presence check response message received by the presence check response receiving unit, and determines that the communication device having the layer 2 address selected by the address selection unit is not present on the network when it is discriminated that there is no presence check response message received by the presence check response receiving unit; and
   an address change unit which changes a current layer 2 address for a communication interface of the communication device into the layer 2 address selected by the address selection unit when a communication device having the layer 2 address selected by the address selection unit is found not to be present on the network based on the determination of the address duplication determination unit.

2. A communication device comprising:
   an address selection unit which selects a layer 2 address that is a change candidate for the communication device;
   a presence check request generation unit which generates a presence check request message, the presence check request message storing, in a destination layer 2 address storage area, only the layer 2 address selected by the address selection unit, the layer 2 address being used as data for responding, by another communication device which received a data link request data and is connected the communication device via a network, by a data link layer response data to be a response for the communication device, the data link layer request data storing, in a transmission source layer 2 address storage area, a current layer 2 address of the communication device, the presence check request message storing, in a destination layer 3 address storage area, at least one of a broadcast address and a multicast address;
   a presence check request transmission unit which transmits the presence check request message generated by the presence check request generation unit via a network to which the communication device is connected;
   a presence check response receiving unit which receives a presence check response message as the data link layer response data to the presence check request message via the network to which the communication device is connected;
   an address duplication determination unit which determines that a communication device having the layer 2 address selected by the address selection unit is present on the network when it is discriminated that there is the presence check response message received by the presence check response receiving unit, and determines that the communication device having the layer 2 address selected by the address selection unit is not present on the network when it is discriminated that there is no presence check response message received by the presence check response receiving unit; and
   an address change unit which changes a current layer 2 address for a communication interface of the communication device into the layer 2 address selected by the address selection unit when the communication device having the layer 2 address selected by the address selection unit is found not to be present on the network based on the determination of the address duplication determination unit.

3. The communication device according to claim 1,
   wherein the presence check request generation unit generates a plurality of different types of presence check request messages storing, in the destination layer 2 address storage area, only the same layer 2 address,
   the presence check request transmission unit transmits the plurality of different types of the presence check request messages, and
   when the address duplication determination unit receives at least one type of presence check request message among the plurality of different types of the presence check request messages, the address duplication determination unit determines that a communication device having the layer 2 address selected by the address selection unit is present in the same network.

4. The communication device according to claim 1,
   wherein when the presence check request transmission unit does not receive the presence check response message within a previously set time after transmitting the presence check request message, the address duplication determination unit determines that a communication device having the layer 2 address selected by the address selection unit is not present on the network.

5. The communication device according to claim 1,
wherein the presence check request message transmitted by the presence check request transmission unit is data including data communicated on IP protocol encapsulated, and
a destination IP address of an IP header stores at least one of a broadcast address and a multicast address.

6. The communication device according to claim 1,
wherein the presence check request message transmitted by the presence check request transmission unit includes data communicated on IP protocol encapsulated therein, and
a destination IP address of an IP header is an IP address obtained by combining a network prefix portion of a router advertisement message advertised by a router in IPv6 protocol with the layer 2 address.

7. The communication device according to claim 5,
wherein the data communicated on IP protocol that is transmitted by the presence check request transmission unit is an ICMP echo request message, and
the presence check response message received by the presence check response receiving unit is data having an ICMP echo reply message encapsulated therein.

8. The communication device according to claim 1,
wherein the presence check request message transmitted by the presence check request transmission unit is data communicated on a data link layer including data of a higher layer encapsulated therein, and a communication device having the layer 2 address selected by the address selection unit having received the higher layer data responds with data transmitted on a data link layer having higher layer data, as a response of the same higher layer data to the communication device, encapsulated therein, and
the presence check response message received by the presence check response receiving unit is data with which a communication device having the layer 2 address selected by the address selection unit responds.

9. The communication device according to claim 1, comprising:
an identifier selection unit which extracts a uniquely identifiable identifier in the communication device;
an identifier insertion unit which inserts the identifier selected by the identifier selection unit into a portion of the presence check request message transmitted by the presence check request transmission unit;
an identifier extraction unit which extracts the identifier inserted into the portion of the presence check response message received by the presence check response receiving unit; and
a correspondence discrimination unit which discriminates whether the identifier extracted by the identifier extraction unit is consistent with the identifier inserted by the identifier insertion unit to cause the presence check request message to correspond to the presence check response message.

10. The communication device according to claim 1,
wherein a communication interface of the communication device is a wireless communication interface, and
the communication device further comprises:
a privacy mode setting unit which sets a privacy mode in which a likelihood of tracing of the communication device from others knowing a layer 2 address, before change, of the communication device is restricted by changing the layer 2 address selected by the address selection unit; and a privacy mode execution unit which changes the current layer 2 address into the layer 2 address selected by the address selection unit if it is determined that the communication device having the layer 2 address selected by the address selection unit is not present on the network when the privacy mode is set by the privacy mode setting unit.

11. The communication device according to claim 1, comprising a counting unit which initiates counting from a time when the address duplication determination unit performs address duplication determination and determines whether an expiration date for the determination has elapsed,
wherein the address change unit changes the address on the condition that the address duplication determination unit does not determine that the address is duplicated and the counting unit determines that the expiration date has not elapsed when there is an address change request.

12. The communication device according to claim 10,
wherein the communication device stores a plurality of communication application programs for requesting a privacy mode on a previously determined condition when each application is executed, and
the privacy mode setting unit comprises a privacy mode setting control unit which sets the privacy mode when at least one of the communication application programs requests the privacy mode, and releases the set privacy mode when the communication application programs do not request the privacy mode.

13. The communication device according to claim 10, comprising:
a privacy mode switching unit which manages an operation according to the privacy mode set by the privacy mode setting unit to be valid or invalid;
a privacy mode execution condition storage unit which stores a condition relating to an operation in the privacy mode set by the privacy mode setting unit;
a network access control unit which controls a connection with a wireless base station; and
a privacy mode operation notification unit which notifies the privacy mode switching unit of whether a privacy mode is to be operated by the privacy mode switching unit according to conformance of a condition relating to an operation in the privacy mode stored in the privacy mode execution condition storage unit when the network access control unit selects a wireless base station to which the communication device is connected.

14. The communication device according to claim 13,
wherein the privacy mode execution condition storage unit stores information for identifying the wireless base station and the network, and
the network access control unit acquires the information for identifying the wireless base station and the network from the wireless base station to which the communication device is connected, and compares the acquired information with the information stored in the privacy mode execution condition storage unit to determine whether a privacy mode is to be operated.

15. The communication device according to claim 1,
wherein the layer 2 address is a MAC address.

16. The communication device according to claim 15,
wherein the address selection unit sequentially selects the MAC addresses from a previously held MAC address list.

17. The communication device according to claim 15,
wherein the address selection unit randomly selects the MAC address from a previously held MAC address list.

18. The communication device according to claim 15, wherein the address selection unit acquires the MAC address from a communication device that manages the MAC address, which is connected to the network.

19. A communication method comprising:

selecting a layer 2 address that is a change candidate for a communication device;

generating, by a presence check request generation unit of the communication device, a presence check request message, the presence check request message storing, in a destination layer 2 address storage area, only the selected layer 2 address, the presence check request message storing, in a transmission source layer 2 address storage area, a current layer 2 address of the communication device, the presence check request message storing, in a destination layer 3 address storage area, at least one of a broadcast address and a multicast address;

transmitting, by a presence check request transmission unit of the communication device, the presence check request message generated in the presence check request generation via a network to which the communication device is connected;

receiving, by a presence check response receiving unit of the communication device, a presence check response message to the presence check request message via the network to which the communication device is connected;

determining, by an address duplication determination unit of the communication device, that a communication device having the layer 2 address selected in the address selection is present on the network when it is discriminated that there is the presence check response message received in the presence check response receiving, and determining that the communication device having the layer 2 address selected in the address selection is not present on the network when it is discriminated that there is no presence check response message received in the presence check response receiving; and changing, by an address change unit of the communication device, a current layer 2 address for a communication interface of the communication device into the layer 2 address selected in the address selection when a communication device having the layer 2 address selected in the address selection is found not to be present on the network based on the determination of the address duplication determination.

* * * * *